United States Patent
Thornton et al.

(10) Patent No.: US 11,176,528 B2
(45) Date of Patent: Nov. 16, 2021

(54) SECURING CUSTOMIZED THIRD-PARTY CONTENT WITHIN A COMPUTING ENVIRONMENT CONFIGURED TO ENABLE THIRD-PARTY HOSTING

(71) Applicant: Microsoft Technology Licensing, LLC, Redmond, WA (US)

(72) Inventors: John M. Thornton, Kirkland, WA (US); Jason M. Cahill, Woodinville, WA (US)

(73) Assignee: Microsoft Technology Licensing, LLC, Redmond, WA (US)

(\*) Notice: Subject to any disclaimer, the term of this patent is extended or adjusted under 35 U.S.C. 154(b) by 0 days.

(21) Appl. No.: 16/749,804

(22) Filed: Jan. 22, 2020

(65) Prior Publication Data

US 2020/0160300 A1   May 21, 2020

Related U.S. Application Data

(62) Division of application No. 15/610,605, filed on May 31, 2017, now Pat. No. 10,565,572.

(60) Provisional application No. 62/483,453, filed on Apr. 9, 2017.

(51) Int. Cl.
| | |
|---|---|
| *G06Q 20/12* | (2012.01) |
| *G06Q 20/38* | (2012.01) |
| *G06Q 20/06* | (2012.01) |
| *G06Q 30/06* | (2012.01) |
| *G07F 17/32* | (2006.01) |

(52) U.S. Cl.
CPC ....... *G06Q 20/1235* (2013.01); *G06Q 20/065* (2013.01); *G06Q 20/3829* (2013.01); *G06Q 30/0613* (2013.01); *G07F 17/3255* (2013.01)

(58) Field of Classification Search
CPC .......... G06Q 20/1235; G06Q 20/3829; G06Q 30/0613; G07F 17/3255
See application file for complete search history.

(56) References Cited

U.S. PATENT DOCUMENTS

| | | | |
|---|---|---|---|
| 8,213,641 B2 | 7/2012 | Faller et al. | |
| 9,411,882 B2 | 8/2016 | Cory et al. | |
| 2012/0317034 A1* | 12/2012 | Guha | .................. G07F 17/3251 705/65 |

(Continued)

OTHER PUBLICATIONS

"Final Office Action Issued in U.S. Appl. No. 15/610,601", dated Oct. 7, 2020, 16 Pages.

(Continued)

*Primary Examiner* — Ellen Tran

(57) ABSTRACT

Disclosed herein are representative embodiments of methods, apparatus, and systems for facilitating the use and exchange of customized third-party content in a distributed computing environment that allows for third-party hosting. Embodiments of the disclosed technology concern an application store within an application (e.g., an "in-app app store"). The application store can offer downloadable digital content and/or roaming entitlements to a user of the application. Further, in particular embodiments, the downloadable content and/or entitlements are generated by a third party (e.g., a party different than the provider/publisher of the application and the user of the application). Also disclosed are methods and mechanisms for copy-protecting such content.

20 Claims, 14 Drawing Sheets

(56) References Cited

U.S. PATENT DOCUMENTS

2013/0053142 A1    2/2013   Kress et al.
2014/0236775 A1    8/2014   Gill et al.

OTHER PUBLICATIONS

Office Action dated Mar. 20, 2020, from U.S. Appl. No. 15/610,601, 12 pp.

\* cited by examiner

900 receive a query from a remote computing device to provide data identifying one or more digital offerings, the remoting computing device running an application that provides a virtual environment in which an avatar of the user interacts - 910

↓ retrieve the digital offerings, the digital offerings including one or more digital offerings created by third parties that are separate and different from a creator, publisher, and owner of the application - 912

↓ transmit the digital offerings available for purchase within the application to the remote computing device for inclusion in an in-application marketplace - 914

FIG. 9

SECURING CUSTOMIZED THIRD-PARTY CONTENT WITHIN A COMPUTING ENVIRONMENT CONFIGURED TO ENABLE THIRD-PARTY HOSTING

CROSS-REFERENCE TO RELATED APPLICATIONS

This application is a divisional of U.S. patent application Ser. No. 15/610,605, entitled "SECURING CUSTOMIZED THIRD-PARTY CONTENT WITHIN A COMPUTING ENVIRONMENT CONFIGURED TO ENABLE THIRD-PARTY HOSTING," and filed on May 31, 2017, which claims the benefit of U.S. Provisional Application No. 62/483,453, entitled "FACILITATING CUSTOMIZED THIRD-PARTY CONTENT WITHIN A COMPUTING ENVIRONMENT CONFIGURED TO ENABLE THIRD-PARTY HOSTING" and filed on Apr. 9, 2017, which are hereby incorporated herein by reference.

FIELD

This application relates to innovations in facilitating and controlling customized digital media data for applications that may originate from a first-party host but be shareable with one or more third-party hosts.

SUMMARY

Disclosed below are representative embodiments of methods, apparatus, and systems for facilitating the use and exchange of customized third-party content in a distributed computing environment that allows for third-party hosting.

Embodiments of the disclosed technology concern an application store within an application (e.g., an "in-app app store"). The application store can offer downloadable digital content and/or roaming entitlements to a user of the application. Further, in particular embodiments, the downloadable content and/or entitlements are generated by a third party (e.g., a party different than the provider/publisher of the application and the user of the application).

In one example embodiment, a query is received from a remote computing device executing an application. In this example, the query is to provide (return) data identifying one or more digital offerings available for purchase within the application. Further, the application in this embodiment is an application that provides a virtual environment in which an avatar of a user interacts and/or navigates. The digital offerings available for purchase within the application are then received (e.g., from a separate server or database storing the available digital offerings). In this embodiment, the digital offerings include one or more digital offerings created by third parties that are separate and different from a creator, publisher, and owner of the application. The digital offerings available for purchase within the application are transmitted to the remote computing device for inclusion in an in-application marketplace displayed on a display associated with the remote computing device.

In another embodiment, a first server (e.g., a storefront/marketplace server) provides to a remote computing device executing an application one or more digital offerings available for purchase from an in-application marketplace within the application. In this example embodiment, the application is an application providing a virtual environment in which an avatar of the user interacts and/or interacts. A second server (e.g., a third-party server) different and separate from the first server, provides a virtual environment for the user of the remote computing device. The second server receives data confirming a purchase of one of the digital offerings via the in-application marketplace. The second server allows the confirmed one of the digital offerings to be used in the virtual environment hosted by the second server.

In a further embodiment, data identifying digital content previously purchased within the application is received from a remote server (e.g., a wallet and in-app purchases server). In this embodiment, the application is an application providing a virtual environment in which an avatar of the user of the first remote computing device interacts and/or navigates. A database of downloadable digital content for the application is queried to retrieve the purchased digital content. Purchased digital content for the first-platform-specific version of the application is retrieved. In this embodiment, the retrieved purchased digital content for the first-platform-specific version of the application is adapted for use on the first platform even though the purchased digital content was originally purchased on a second computing device executing a second-platform-specific version of the application on a second platform. Further, in certain embodiments, the second computing device is different and separate from the first computing device.

In another example embodiment, a query is received from a remote computing device executing an application. In this embodiment, the query requests data identifying one or more purchased digital offerings previously purchased within the application. Further, in this embodiment, the application is an application providing a virtual environment in which an avatar of a user of the remote computing device interacts and/or navigates. Encrypted keys are retrieved for the one or more purchased digital offerings. The encrypted keys to the remote computing device executing the application are transmitted.

In a further example embodiment, a query is transmitted to a first remote computing device. In this example, the transmitting is from a first computing device executing an application and the query requests provision of encrypted ownership data for one or more previously purchased digital offerings for the application. Encryption keys are received for the one or more purchased digital offerings from the first remote computing device. A request is transmitted to a second remote compute device for encrypted versions of the one or more purchased digital items. The encrypted versions of the one or more purchased digital items are downloaded from the second remote computing device. The encrypted versions of the one or more purchased digital items are decrypted for use in the application.

A request is transmitted to a server storing user records (e.g., a wallet and in-app purchases server). In this example embodiment, the request is for proofs of ownership of one or more previously purchased digital offerings. The requested proofs of ownership are received from the server storing user records. A virtual environment is joined. In this example embodiment, the virtual environment is hosted by a third-party server hosting the virtual environment for the application. Further, the third-party server is operated by an entity separate and different than the creator, publisher, and owner of the application. The proofs of ownership are also transmitted to the third-party server, thereby enabling access to the previously purchased digital offerings in the virtual environment hosted by the third-party server.

Implementations of the disclosed technology provide numerous technical and internet-centric advantages—including: the ability to share computational resources (thereby reducing local computational process load), the ability to share memory resources (thereby reducing local memory resource load), the ability to facilitate the sale and purchase of third-party developer content through a common in-app marketplace, the ability to track and manage purchased digital content, the ability to facilitate the sale and purchase of digital content across a spectrum of platforms that support a user instance of an application, the ability to provide hosted content for an application (e.g., worlds, mini-games, etc.) through distributed first- or third-party hosts (thereby reducing the computational and memory burden on the local computing device of the user), the ability to host game worlds in a scalable environment (e.g., a cloud-based environment) that uses only a small computational and memory footprint on local devices and instead relies on distributed computing and memory resources to host such worlds (e.g., in many instances, the memory and computational burden for providing the hosted world exceeds the computing and memory resources available on the local computing device, such as a mobile device) and/or the ability to manage digital rights related to the purchased digital content.

BRIEF DESCRIPTION OF THE DRAWINGS

FIG. 9 is a flowchart of an example method for providing an in-application marketplace for digital offerings (e.g., entitlements and/or durables) in accordance with the disclosed technology and as illustrated in FIG. 5.

DETAILED DESCRIPTION

I. General Considerations

Disclosed below are representative embodiments of methods, apparatus, and systems for facilitating the use and exchange of customized third-party content in a distributed computing environment that allows for third-party hosting. The disclosed methods, apparatus, and systems should not be construed as limiting in any way. Instead, the present disclosure is directed toward all novel and nonobvious features and aspects of the various disclosed embodiments, alone or in various combinations and subcombinations with one another. Furthermore, any features or aspects of the disclosed embodiments can be used in various combinations and subcombinations with one another. For example, one or more method acts from one embodiment can be used with one or more method acts from another embodiment and vice versa. The disclosed methods, apparatus, and systems are not limited to any specific aspect or feature or combination thereof, nor do the disclosed embodiments require that any one or more specific advantages be present or problems be solved.

The innovations can be implemented as part of a method, as part of a computing system configured to perform the method, or as part of computer-readable media storing computer-executable instructions for causing a processing device (e.g., a circuit, such as a microprocessor or microcontroller), when programmed thereby, to perform the method. The various innovations can be used in combination or separately.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the figures may not show the various ways in which the disclosed methods can be used in conjunction with other methods.

Various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Different embodiments use one or more of the described innovations. Some of the innovations described herein address one or more of the problems noted in the background. Typically, a given technique/tool does not solve all such problems.

As used in this application and in the claims, the singular forms "a," "an," and "the" include the plural forms unless the context clearly dictates otherwise. Additionally, the term "includes" means "comprises." Further, as used herein, the term "and/or" means any one item or combination of any items in the phrase.

II. Example Computing Environments

Figure 1:
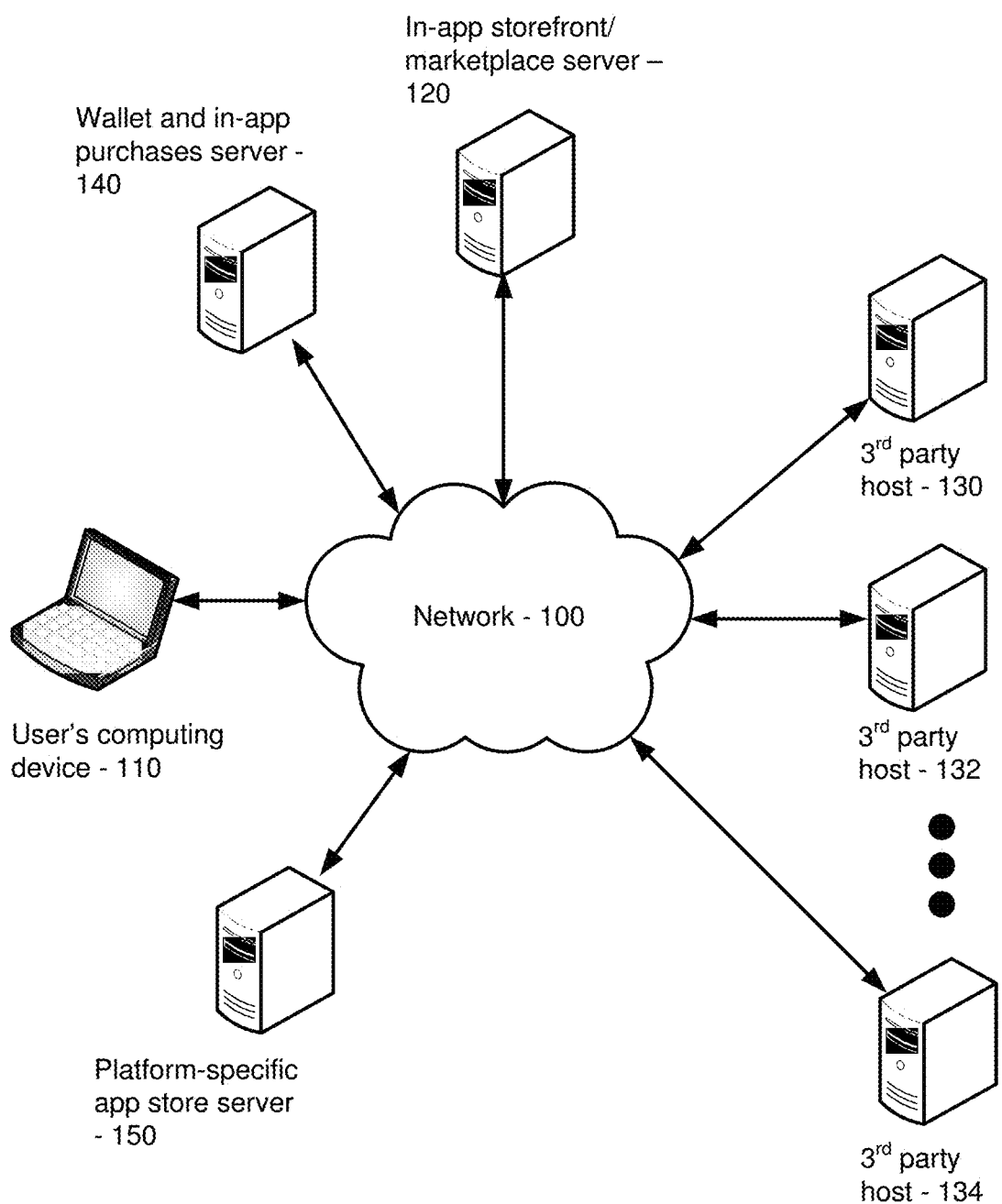
FIG. 1 is a schematic block diagram illustrating an example network configuration in which embodiments of the disclosed technology can be implemented.

The disclosed technology has particular application to game applications that are executed on an end user's computing device (e.g., gaming console, PC, mobile device, or the like) and that also communicate with one or more remote computing devices during game execution (e.g., gaming applications that are supported in-game by one or more remote (e.g., cloud-based) servers). FIG. 1 is a schematic block diagram illustrating an example network configuration 100 in which embodiments of the disclosed technology can be implemented. The network configuration 100 includes a user's computing device 110. As noted, the user's computing device can be a wide variety of devices, such as a gaming console, PC, mobile device, or the like. Further, the device may be operating any of a variety of operating system or platforms (e.g., Windows, Unix, IOS, Android, and the like).

The illustrated embodiment further illustrates a game provider/publisher server 120 (shown as storefont/marketplace server 120) that provides an in-game storefront and marketplace (e.g., a marketplace as disclosed herein). The illustrated network additionally shows one or more third-party servers (shown as third-party hosts 130, 132, 134) configured to host third-party content, such as third-party worlds, mini-games, digital content available through the marketplace, and the like). The illustrated network further includes a wallet and in-game purchases server 140 that securely maintains various records related to the user's account and purchase records. For example, the wallet and in-game purchases server 140 can maintain a record of a user's current balance of a real world currency or virtual currency (e.g., Minecraft coins), a record of a user's purchases (including digital proofs of purchase), and/or a record of transactions with a platform-specific app store server (e.g., the Apple app store server or the Android app store server). The illustrated network further includes a platform-specific app store server 150. This platform-specific app store server 150 can be dependent on the company or organization that provides operating system on which the user's computing device operates. For instance, if the user's computing is an Apple IOS device, then the server can be an Apple server that hosts the Apple app store. The platform-specific app store serves as a marketplace where real-world currency can be used to purchase virtual currency (e.g., Minecraft), which is then available to the user to purchase in-app digital content via the in-app marketplace hosted by in-app storefront/marketplace server 120. Notably, the network 100 supports a single user's account across multiple platforms. For instance, a user may play a game on a first device (e.g., a PC), make purchases from the in-app marketplace (hosted by server 120), log out, log in on a second device (e.g., an Android phone), and retrieve the digital content for the in-app purchases made on the first device. In this way, the network configuration supports a user's account across a spectrum of operating system platforms.

In operation, the user's computing device 110 can be in communication, via a network 102, with the storefront/marketplace server 120, the wallet and in-game purchases server 140, the platform-specific app store server 150, and/or a selected one of the third-party hosts 130, 132, 134 as that host hosts the user's in-game avatar in the world served by the respective third-party host. Such communication can be performed, for example, via the internet (e.g., using the HTTP protocol) or other network connection.

Implementations of the disclosed technology provide numerous technical and internet-centric advantages—including: the ability to share computational resources (thereby reducing local computational process load), the ability to share memory resources (thereby reducing local memory resource load), the ability to facilitate the sale and purchase of third-party developer content through a common in-app marketplace, the ability to track and manage purchased digital content, the ability to facilitate the sale and purchase of digital content across a spectrum of platforms that support a user instance of an application, the ability to provide hosted content for an application (e.g., worlds, mini-games, etc.) through distributed first- or third-party hosts (thereby reducing the computational and memory burden on the local computing device of the user), the ability to host game worlds in a scalable environment (e.g., a cloud-based environment) that uses only a small computational and memory footprint on local devices and instead relies on distributed computing and memory resources to host such worlds (e.g., in many instances, the memory and computational burden for providing the hosted world exceeds the computing and memory resources available on the local computing device, such as a mobile device) and/or the ability to manage digital rights related to the purchased digital content.

Figure 2:
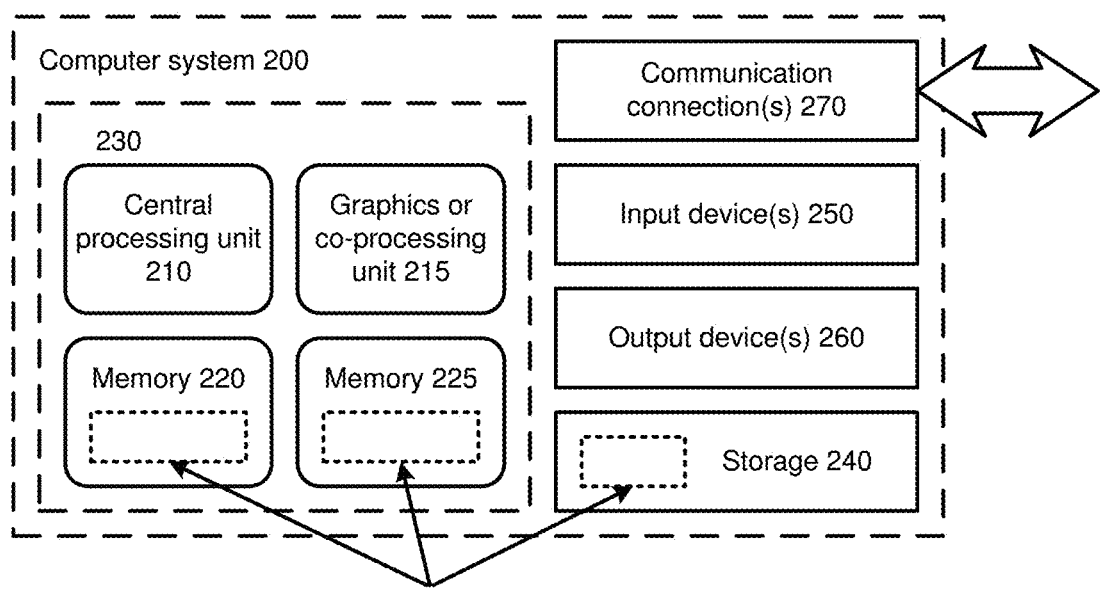
FIG. 2 illustrates a generalized example of a suitable computer system in which the described innovations may be implemented.

FIG. 2 illustrates a generalized example of a suitable computer system 200 in which the described innovations may be implemented. The example computer system 200 can implement, for example, any of the devices or servers shown in FIG. 1 and/or any of the disclosed features, aspects, and/or functions of the disclosed technology. With reference to FIG. 2, the computer system 200 includes one or more processing devices 210, 215 and memory 220, 225. The processing devices 210, 215 execute computer-executable instructions. A processing device can be a general-purpose CPU, GPU, processor in an ASIC, FPGA, or any other type of processor. In a multi-processing system, multiple processing units execute computer-executable instructions to increase processing power. For example, FIG. 2 shows a CPU 210 as well as a GPU or co-processing unit 215. The tangible memory 220, 225) may be volatile memory (e.g., registers, cache, RAM), non-volatile memory (e.g., ROM, EEPROM, flash memory, NVRAM, etc.), or some combination of the two, accessible by the processing device(s). The memory 220, 225 stores software 280 implementing one or more innovations described herein, in the form of computer-executable instructions suitable for execution by the processing device(s).

A computer system may have additional features. For example, the computer system 200 includes storage 240, one or more input devices 250, one or more output devices 260, and one or more communication connections 270. An interconnection mechanism (not shown) such as a bus, controller, or network interconnects the components of the computer system 200. Typically, operating system software (not shown) provides an operating environment for other software executing in the computer system 200, and coordinates activities of the components of the computer system 200.

The tangible storage 240 may be removable or non-removable, and includes magnetic disks, magnetic tapes or cassettes, optical storage media such as CD-ROMs or DVDs, or any other medium which can be used to store information and which can be accessed within the computer system 200. The storage 240 stores instructions for the software 280 implementing one or more innovations described herein.

The input device(s) 250 may be a touch input device such as a keyboard, mouse, game controller, pen, or trackball, a voice input device, a scanning device, or another device that provides input to the computer system 200. For video or image input, the input device(s) 250 may be a camera, video card, TV tuner card, screen capture module, or similar device that accepts video input in analog or digital form, or a CD-ROM or CD-RW that reads video input into the computer system 200. The output device(s) 260 include a display device. The output device(s) may also include a printer, speaker, CD-writer, or another device that provides output from the computer system 200.

The communication connection(s) 270 enable communication over a communication medium to another computing entity. For example, the communication connection(s) 270 can connect the computer system 200 to the internet and communicate with a remote server providing support/hosting services according to the functionality described herein. The communication medium conveys information such as computer-executable instructions, audio or video input or output, image data, or other data in a modulated data signal.

A modulated data signal is a signal that has one or more of its characteristics set or changed in such a manner as to encode information in the signal. By way of example, and not limitation, communication media can use an electrical, optical, RF, or other carrier.

The innovations presented herein can be described in the general context of computer-readable media. Computer-readable media are any available tangible media that can be accessed within a computing environment. By way of example, and not limitation, with the computer system 200, computer-readable media include memory 220, 225, storage 240, and combinations of any of the above. As used herein, the term computer-readable media does not cover, encompass, or otherwise include carrier waves or signals per se.

The innovations can be described in the general context of computer-executable instructions, such as those included in program modules, being executed in a computer system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computer system.

The terms "system" and "device" are used interchangeably herein. Unless the context clearly indicates otherwise, neither term implies any limitation on a type of computer system or computer device. In general, a computer system or computer device can be local or distributed, and can include any combination of special-purpose hardware and/or general-purpose hardware with software implementing the functionality described herein.

The disclosed methods can also be implemented using specialized computing hardware configured to perform any of the disclosed methods. For example, the disclosed methods can be implemented by an integrated circuit (e.g., an ASIC such as an ASIC digital signal processor ("DSP"), a GPU, or a programmable logic device ("PLD") such as a field programmable gate array ("FPGA")) specially designed or configured to implement any of the disclosed methods.

III. Example Embodiments

A. Overview

Embodiments of the disclosed technology concern an application store within an application (e.g., an "in-app app store"). The application store can offer downloadable digital content and/or roaming entitlements to a user of the application. Further, in particular embodiments, the downloadable content and/or entitlements are generated by a third party (e.g., a party different than the provider/publisher of the application and the user of the application). In particular implementations, the third party also has the capability to control or influence a variety of factors related to how the content and/or entitlements are provided in the in-app app store (e.g., one or more of the price, the presentation, associated data content, etc.)

For example purposes, this disclosure uses the Minecraft application available from Microsoft Corporation as an example application in which the disclosed technology can be implemented. It should be understood, however, that this implementation is by way of example only, as the technology can be used in a wide variety of gaming and other contexts.

The disclosed technology provides the capability to sell content from individuals/companies/creators (e.g., third-party individuals/companies/creators) within an in-game store (e.g., the in-game Minecraft store, which can be configured to offer third-party content at any time or, in some embodiments, only at times the user is in a particular environment hosted by a third party). In some examples, the application (e.g., Minecraft) runs on a large collection of platforms, many of which gate purchases via their own app stores (e.g., the platform-specific app stores hosted by one or more platform-specific app store servers 150). To accomplish the sale of content on these platforms, the application (e.g., Minecraft) can use a virtual currency (e.g., Minecraft coins) that can be purchased directly from each platform's app store (e.g., the platform's app store can offer 1000 Minecraft coins for US$10, 5000 Minecraft coins for US$50, or any other amount at a suitable currency rate). This "consumable purchase" of virtual currency can be redeemed from each platform and their value stored within a cross-platform player account (e.g., an account maintained by the wallet and in-game purchases server 140 or other account centrally controlled by an application provider/publisher). In particular implementations, the virtual currency can be spent anywhere the user can sign in to the application and, in certain embodiments, on any platform.

By establishing a wallet of virtual currency (e.g., Minecraft coins), the application provider/publisher has the ability to track the spending on items, grant entitlements, and/or facilitate the roaming of those entitlements anywhere. This leads to a full marketplace within the application environment where items and entitlements can be offered and sold by the first party (e.g., by the application provider/publisher) as well as by third parties. This last piece is notable, as embodiments of the disclosed technology provide a full storefront within the application (e.g., Minecraft) that is configured to be appear on all platforms and seamlessly tracks the purchase and accounting of items, which can then be attributed to, and paid out to the item's makers.

In particular example embodiments, several types of items can be offered in the marketplace. For instance, one or more of the following types of purchases can be provided within the marketplace: durable items and entitlements. Here, a durable item is something that one pays for and is granted permanent ownership to. In certain examples, a durable item manifests itself as a digital download that one can use in copies of the application running on different platforms (e.g., running on any platform). Nonlimiting examples of durable items include one or more of:

Player skins—decorative replacements to the player's in-game avatar;

Texture packs—decorative reskins of blocks, items, entities, and parts of the game's user interface;

Resource packs—additions to or replacements of in-game elements that are not necessarily visual in nature: sound effects, music, creature behavior, item buffs, and so on;

Worlds—entirely custom worlds built by skilled creatures for exploration, multiplayer, or adventure; and/or Mashups—combinations of all of the above to create a total conversion of Minecraft into new games and experiences The second kind of example purchase is an entitlement. An entitlement represents ownership to a known, virtual item within a specific application server (e.g., Minecraft server), whether hosted by a first party (e.g., the provider (originator)/publisher of the application) or a third party. Nonlimiting examples of entitlements include one or more of:

Status—within many application servers (e.g., hosted by a first party or third party), there are membership offers that distinguish players; these can include unique appearance elements (such a colored name tag), or unique server-delivered player skins;

Pets—when connected to a specific application server, a player can be automatically accompanied by an autonomous "pet" that follows their owner around;

Consumable items—a digital item that persists until used in the application environment; for example, a player can purchase access to 10 single-use fireworks, which can then be used/spent to wow their friends and other players;

Access to ticketed areas—servers can decide to restrict some areas of their experiences to tickets or paywalls; and/or Mystery boxes—servers can offer a collection of items with fixed distributions (e.g., similar to sealed, foiled packs from collectible card games); upon purchase, the application's marketplace can compute the set of entitlements based on the specified server inventory and rarity; the player can then "open the pack" to discover what they have purchased.

B. On-Boarding to the Application in-Game Store

In certain embodiments, creators that have created content can join a creator's program offered by the application provider/publisher (e.g., Minecraft creator's program). This program is similar to the membership of other platform's developer programs. Joining this program allows the content creator to submit digital content items and entitlements for sale within an in-app app store. Upon receipt of items, the application provider/publisher can review and validate the items for technical correctness and content appropriateness. If approved, the creator can submit one or more of a wholesale price, marketplace art, and/or metadata. The content can then be finalized and packaged and included in either the general application's app store or a third-party's world-specific app store (e.g., managed by the application provider/publisher). Once approved, such content can be made available as part of an update to the application.

Durable items can have the option of being copy-protected to reduce the chances of piracy or accidental misuse. When selected, and in certain example of the disclosed technology, the copy protection transformation can be applied to the creator's content before uploading it to the store.

Figure 3:
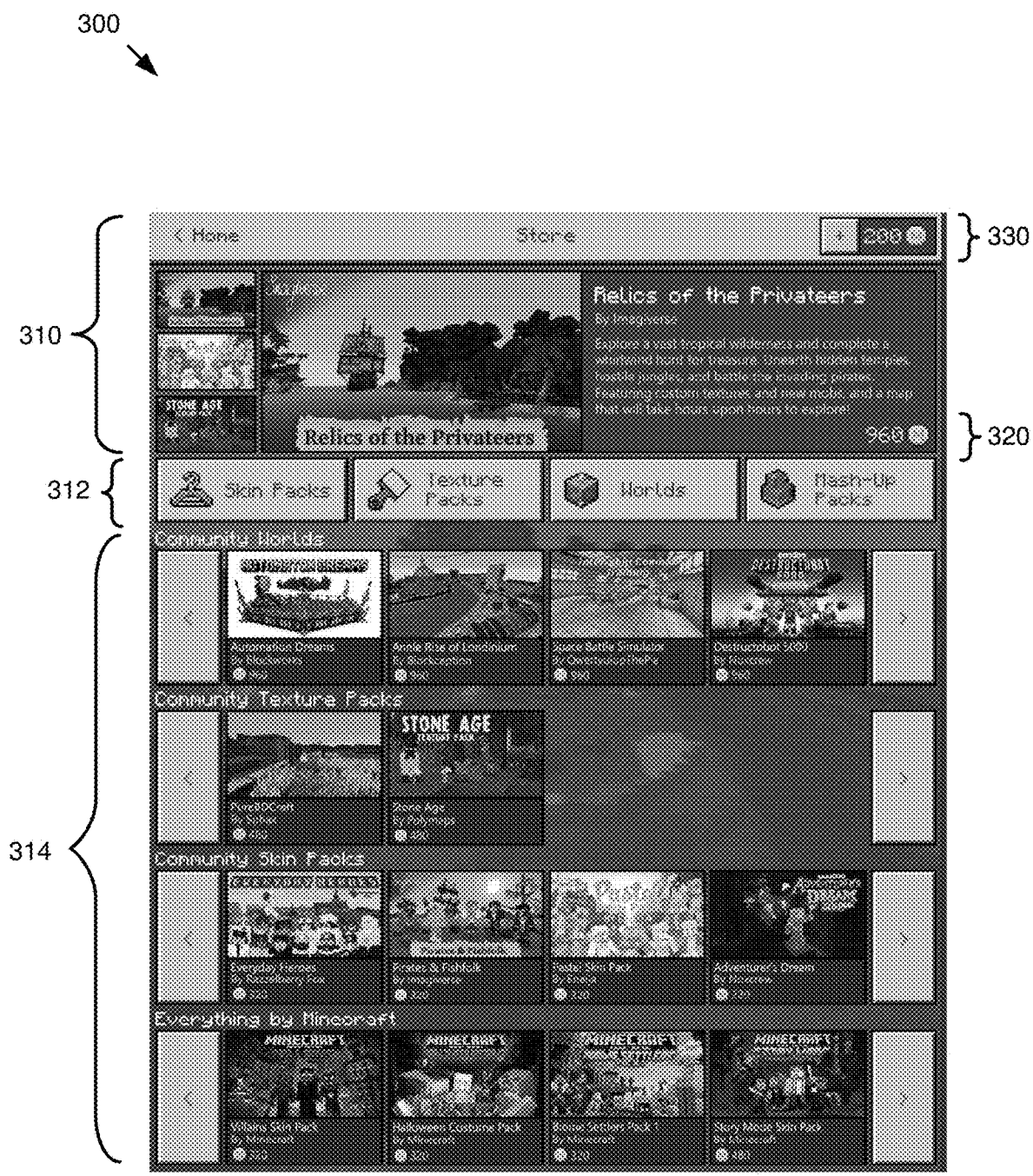
FIGS. 3-4 show example screen shots for a marketplace in accordance with embodiments of the disclosed technology.
Figure 4:
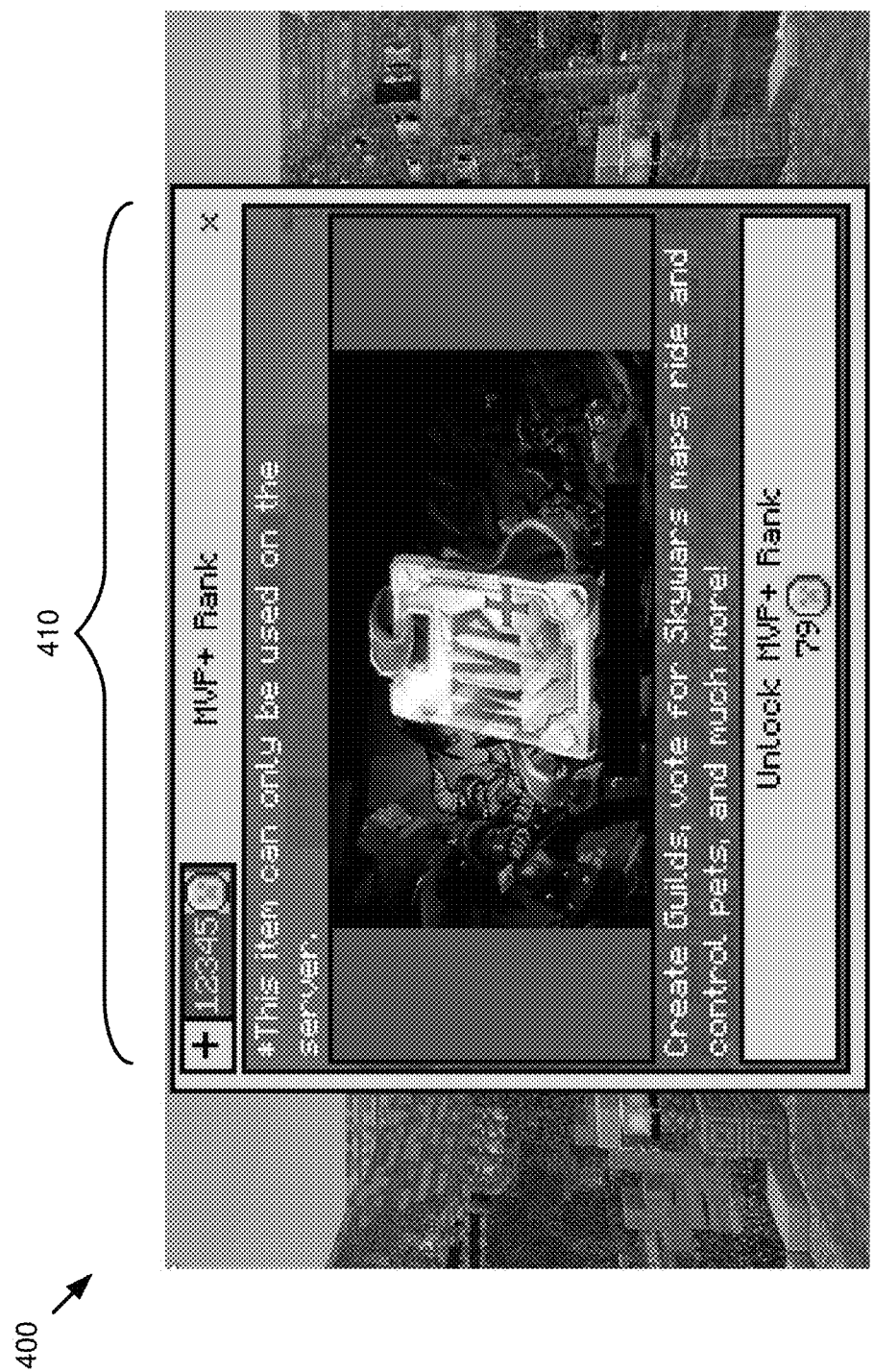

FIGS. 3-4 show example screen shots 300 and 400 for a marketplace in accordance with embodiments of the disclosed technology.

More specifically, FIG. 3 shows a screen shot 300 of a top-level marketplace screen showing a currently selected digital content package 310 ("relics of the privateers") as well as buttons 312 for selecting to view skin packs, texture packs, worlds, or mash-up packs along with selected content 314 in the form of "community worlds", "community texture packs", "community skin packs", and "everything be Minecraft", where the community offerings represent third-party offerings (e.g., content developed by third party users, and not by the application provider/publisher) and the Minecraft offerings represent offerings by the application provider/publisher. For each offering, the amount of virtual currency to purchase the item is also shown (e.g., virtual purchase price 320). Also shown is an account balance 330 showing the available amount of virtual currency.

FIG. 4 is a screen shot 400 for an item screen that can be displayed to the user to describe in greater detail what a particular item 410 of digital content is and what benefits it confers.

C. Availability, Sales, Analytics, and Commerce Tracking

In some example embodiments, content creators (e.g., third-party content creators) can be in full control of when their items are released and/or retired from the marketplace. Further, in certain examples, content creators (e.g., third-party content creators) set their own wholesale price for items and the application provider/publisher pays the creators this fixed price for each completed transaction. Further, in some cases, creators can choose to put items on sale for limited time periods or permanently.

Example marketplaces (e.g., the Minecraft Marketplace) can be configured to track the analytics and purchasing information for each item or entitlement. This information can be collected for a variety of purposes, including one or more of:

general analytics and trends for creators—such as how many product views they've received, frequency of purchase, frequency of use, and/or total time spent playing; and/or commerce and payout—the application can be configured to further track and ledger financial transactions to track and pay creators for each successfully completed transaction.

D. Single Point of Ownership

In some embodiments, purchasing within the application (e.g., the Minecraft application) can be configured to occur through a single in-game marketplace, such as the marketplace illustrated in FIGS. 3 and 4. Through this marketplace, the application provider/publisher can not only track activity and transactions, but can also maintain player's virtual currency (e.g., Minecraft coins) balances and purchases. For instance, the wallet and in-app purchases server 140 can maintain the relevant records for the user's account and purchases. In the case of durable items, their purchases can enable a user to download and use their items on any instance of the application (e.g., an application running any available platform, such as Windows, IOS, and/or Android). In the case of entitlements, the application provider/publisher can provide the list of purchases to the appropriate server (e.g., the third-party Minecraft servers) on each player log-in. This helps ensure that third-party servers (e.g., third-party Minecraft servers) are not required to store or track ownership to entitlements and further allows the marketplace provided by the application provider/publisher to "make customers whole" if a given third-party server was to be retired from service.

With the marketplace available within the app, a central server hosting the marketplace and operated by the application provider/publisher can initiate an in-game sale of third-party content to a user playing within a third-party environment (e.g., a third-party world or mini-game). The central server for the application operated by the application provider/publisher can be configured to display a suggestion to buy content (e.g., armor) within the game. The user can then buy content from within the game through the application marketplace operated and maintained by the application provider/publisher (e.g., the Minecraft marketplace) for a user of the application (e.g., for a user of the Minecraft Mini Game).

In certain example embodiments, the user does not need to stop playing the game or go to a site provided by the third party (e.g., a third-party Minecraft Mini Game host server) to purchase the content. Instead, and in this example, the content can be available directly through the marketplace supplied by the application provider/publisher. The marketplace can be configured to share the proof of purchase to, and revenue share with, the third party (e.g., the third-party Minecraft Mini Game host server).

In some examples, the marketplace available from within the application also provides sign-in capabilities for in-application content purchasing (e.g., Xbox LIVE account sign in for in application content purchasing). This gives the third parties (e.g., Minecraft Mini Game hosts) the benefit of player tracking, which can be used to remove accounts for misbehavior.

E. Remixing Content while Maintaining Copy Protection

Most systems that perform "copy protection" or "digital rights management" do so in a single mode at a time. For instance, a music player typically allows a user to play their own unprotected songs, purchase and play protected music, or stream protected radio streams that the user gets "transient access", not permanent access to.

Certain video games allow for the creation of third-party digital content, such as custom worlds and/or mini-games. Minecraft, for example, is a video game about creation, exploration, survival, and adventure. One of its notable offerings is the ability for third-party creators to create custom worlds, mini-games, and/or adventures. To date, the content made by creators within Minecraft has been unprotected and free to all. As explained above, certain embodiments allow content made by creators who are not part of the application provider/publisher to be sold (e.g., through an in-app marketplace as discussed above).

In order to establish and maintain the value of this content, and in certain embodiments of the disclosed technology, a layer of copy protection is provided to each durable item that is sold on behalf of the third-party creators. This creates a complicated situation where it is still desirable to maintain all of the modes of play, but with content from a disparate set of creators being mixed together at playtime. This is also challenged by the fact that the game provider/publisher may want to: encourage creators to create their own creations in their copy of the game (e.g., Minecraft) while offline; and maintain the protection and integrity of the purchased content.

Embodiments of the disclosed technology address these issues by providing one or more of the following functionalities:

(1) players can purchase protected content that they can download and play locally while online;

(2) players can create their own worlds, skins, textures, and/or behaviors;

(3) players can connect to hosted game servers (e.g., hosted Minecraft servers) that are serving protected content that the player is transiently licensed to access;

(4) players can host multiplayer games, where their friends do not own the protected content and they become transiently licensed; and/or (5) Any simultaneous mix of the above To accomplish this "remixing", each kind of content can be individually sand boxed and the appropriate restrictions can be applied to each during mixed use. The restrictions that are applied can be one or more of the following:

purchased content validates ownership in local play;
purchased content of one kind cannot access or export the content of another piece of contented the same or different kind, whether locally or online; and/or
while transiently licensed, players cannot save or export content without the protection of the content remaining intact; this means that players may change the state of hosted worlds without owning any of the content in the hosted experience; they can also download their finished work, but they will not be allowed to use it for local play without having ownership to all of the content.

This level of sand boxing is possible because all instances of the application (e.g., all instances of Minecraft) participate in mutual responsibility to protected content and all network transmissions and file storage is securely encrypted.

F. Example Configurations and Communications to Facilitate Embodiments of the Disclosed Technology FIGS. 5-8 are schematic block diagrams showing example network configurations and communications for facilitating embodiments of the disclosed technology. The configurations and communications illustrated in FIGS. 5-8 provide a variety of technical and internet-centric benefits, including one or more of: the ability to share computational resources across multiple distributed computing devices (e.g., remote servers), thereby reducing local computational process load at the computing device executing the main application; the ability to share memory resources across multiple computing devices (e.g., remote servers), thereby reducing local memory resource load at the computing device executing the main application; the ability to facilitate the sale and purchase of third-party developer content through a common in-app marketplace across a spectrum of platforms, thereby reducing the computational, memory, and network resources necessary to support platform-specific marketplaces; the ability to track and manage purchased digital content across a spectrum of platforms that support a user instance of the application, also reducing the computational, memory, and network resources necessary to support platform-specific marketplaces; the ability to provide hosted content for an application (e.g., worlds, mini-games, etc.) through distributed first- or third-party hosts, thereby reducing the computational and memory burden on the local computing device of the user; the ability to host game worlds in a scalable environment (e.g., a cloud-based environment) that uses only a small computational and memory footprint on local devices and instead relies on distributed computing and memory resources to host such worlds (e.g., in many instances, the memory and computational burden for providing the hosted world exceeds the computing and memory resources available on the local computing device, such as a mobile device); and/or the ability to manage digital rights related to the purchased digital content in a digital environment that allows third-party hosts and is available across a spectrum of platforms.

Figure 5:
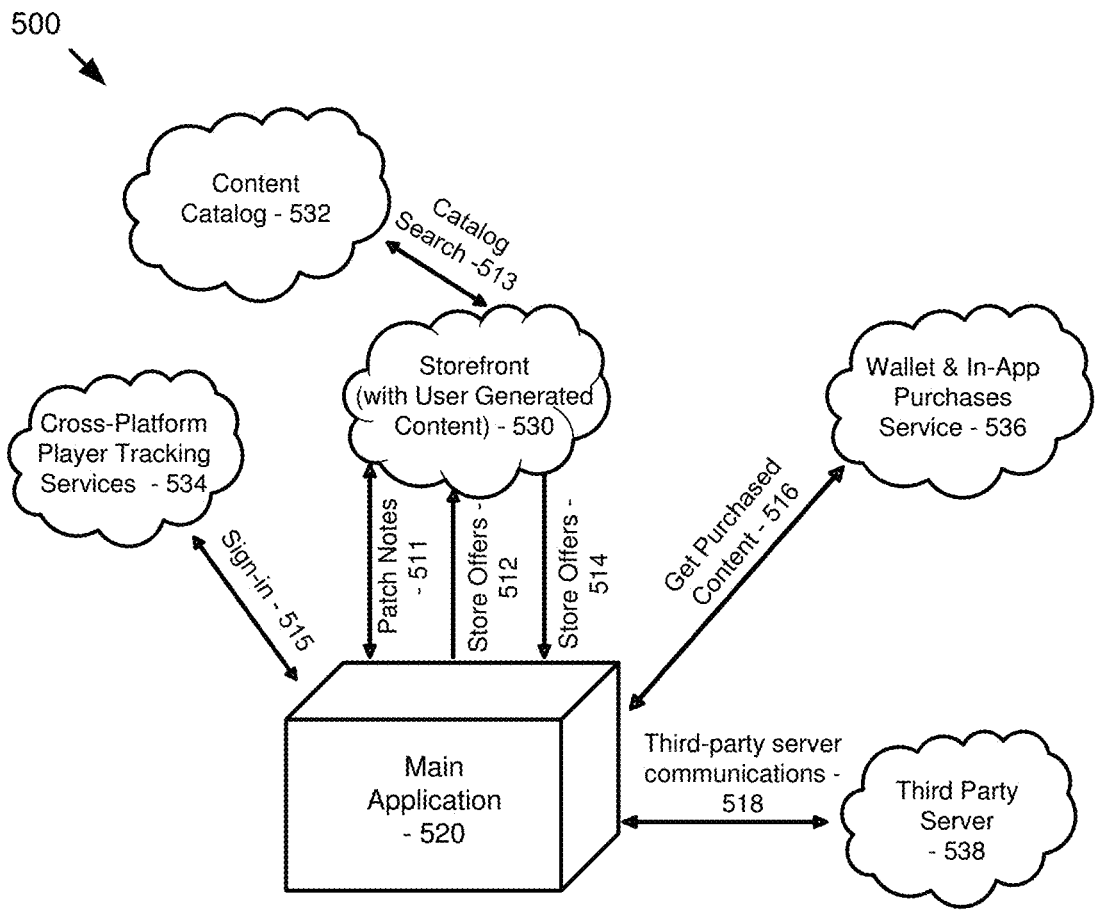
FIGS. 5-8 are schematic block diagrams illustrating example network configurations and series of communications between the network elements.

FIG. 5 is a schematic block diagram 500 illustrating an example network configuration and series of communications between the network elements. The network configuration includes a main application running on a user's computing device. As noted, the user's computing device can be a wide variety of devices, such as a gaming console, PC, mobile device, or the like. Further, the device may be operating any of a variety of operating system or platforms (e.g., Windows, Unix, IOS, Android, and the like). The illustrated embodiment further illustrates a main application server 520 that hosts an application selected for execution by the computing device 502. The main application can be, for example, a game application (e.g., Minecraft or other game application). In the illustrated embodiment, the main application offers a marketplace in which a user may purchase and obtain digital content, including content generated by third-party users (shown as "user generated content"). To facilitate this capability, and in accordance with the illustrated embodiment, one or more additional services can be used. Example services are shown at 530, 532, 534, 536 in FIG. 5 and may be provided by separate servers (as illustrated in FIG. 1), which in turn may be operated and controlled by separate entities or organizations as the entity operating and controlling the main application server 520. Alternatively, any one or more of the illustrated services may be combined and provided by a single server and/or entity.

FIG. 5 shows an example sequence of interactions that occur upon a user logging into the main application with a known user profile. In other words, FIG. 5 shows an example of a typical startup sequence for the main application. The illustrated interactions are shown by way of example only, as any one or more of the interactions may be omitted in certain embodiments, performed in a different sequence, performed concurrently, or replaced by some other actions. Also, additional interactions may also be included that are not illustrated here.

At 511, the main application 520 requests from the storefront service 530 any updated patches or patch notes. This request can be made anonymously.

At 512, the main application 520 requests from the storefront 530 a list of offers available from the storefront service/server 530. This request can be made anonymously.

At 513, the storefront 530 interacts with a content catalog 532 to determine whether there are any updates to the offerings (or, in some embodiments, to retrieve data concerning available offerings (e.g., all available offerings)). The offerings can be for example downloadable digital content, such as the example durables and entitlements noted above. The content catalog 532 can be a database storing digital content, including digital content for multiple platforms on which the main application can be executed (e.g., e.g., Windows, Unix, IOS, Android, and the like). Thus, the content catalog can be considered a universal warehouse that provides digital content across all available platforms.

Further, the offerings available from the content catalog 532 can be digital content (e.g., durables or entitlements, as explained above) created by a third party. For instance, the storefront 530 may be operated by a first party (e.g., the game provider/publisher) but at least some of the digital content in the content catalog 532 can be digital content generated from a third party (e.g., a party, entity, or organization that is separate from the game provider/publisher).

Still further, in some instances, the main application 520 can allow for the execution of mini games. Such mini games allow a user of the computing device 502 to access a third-party server 538 that hosts the mini game and supports game play in an environment hosted by the third-party server with content offered by the third-party server. In some embodiments, the offerings offered by the storefront 530 and maintained by the content catalog 530 can be scoped just for the mini game within the third-party server 538 when the user is connected with the third-party server 538 and playing in the third-party environment. Communications 518 illustrate this scenario where the main application server interacts with a third-party server hosting a particular environment or mini game of the main application server 520.

At 514, the storefront 530 transmits data concerning the offerings to the main application. These offerings can then be displayed within a marketplace that is supported by the main application. For instance, a marketplace user interface, such as shown in FIG. 3, can be displayed to a user and used to show the available offerings to the user. In certain embodiments, the list of offers are filtered by platform and/or minimum client version. For example, the list of offers provided can be platform specific (e.g., Windows, Unix, IOS, Android, and the like) depending on which platform the main application is currently executing on. Further, the list of offers can be filtered in accordance with an application and/or operating system version running at the user's computing device. For instance, some versions of the main application or of the operating system at the user's device may provide support for certain offerings that is not available from earlier versions.

At 515, the user can sign on to a service 534 that provides player tracking services (e.g., across multiple platforms). For example, the player tracking services 534 can be a centralized service (e.g., XBOX Live) that maintains a record of the player's online ID, status, achievements, and/or application downloads. Once signed-in, this data can be shared with the main application 520.

At 516, an interaction is performed with a wallet and in-app purchases service 536 to retrieve the digital content that was previously purchased by the user and that is currently available to the user. For example, such digital content tracked by the wallet and in-app purchases service can include purchased entitlements, purchased durables, or other purchased digital content. The wallet and in-app purchases service 536 can validate the user by user identification information provided by the main application after logging into the player tracking service 534. The wallet and in-app purchases service 536 can transmit the digital content (or a key for enabling the digital content) to the main application 520 for those items that are verified to have been purchased by the user and that are currently available for use.

Figure 6:
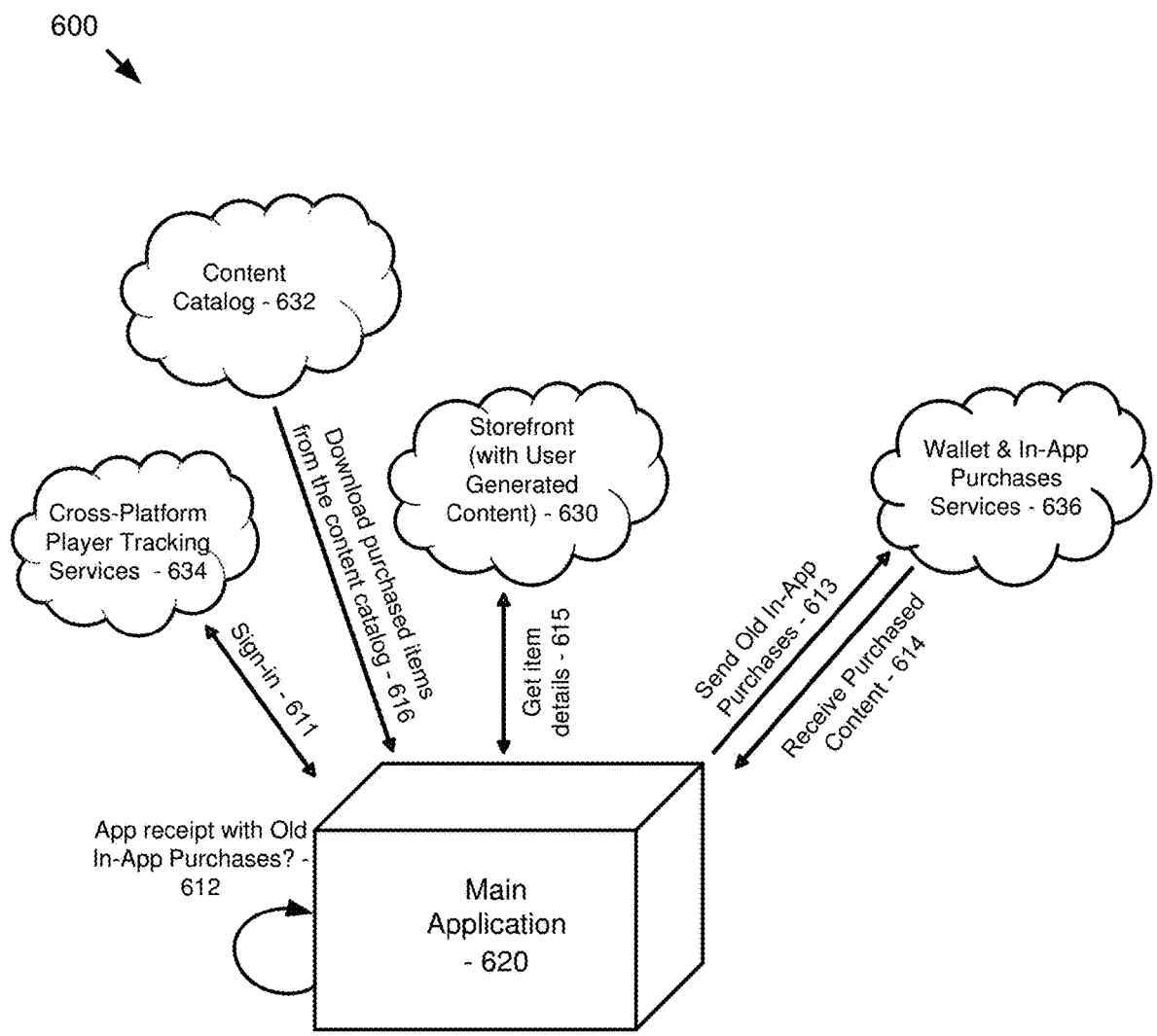

FIG. 6 is a schematic block diagram 600 illustrating another example network configuration and series of communications between network elements. The network configuration includes a main application running on a user's computing device. As noted, the user's computing device can be a wide variety of devices, such as a gaming console, PC, mobile device, or the like. Further, the device may be operating any of a variety of operating system or platforms (e.g., Windows, Unix, IOS, Android, and the like). The main application can be, for example, a game application (e.g., Minecraft or other game application). In the illustrated embodiment, the main application offers a marketplace in which a user may purchase and obtain digital content, including content generated by third-party users (shown as "user generated content"). To facilitate this capability, and in accordance with the illustrated embodiment, one or more additional services can be used. Example services are shown at 630, 632, 634, 636 in FIG. 6 and may be provided by separate servers, which in turn may be operated and controlled by separate entities or organizations as the entity operating and controlling the main application server 620. Alternatively, any one or more of the illustrated services may be combined and operated by a single server and/or entity.

More specifically, FIG. 6 shows an example sequence of interactions that occur upon a user or an operating system requesting to redeem (or restore) purchases. Such an interaction can occur, for example, when a user executes the main application and purchases digital content (e.g., a durable or entitlement) on a first platform, and then continues on a different second platform. For example, a user may start (or continue) playing a game on a first platform and purchasing one or more new items of digital content (e.g., durables and/or entitlements) on a first platform. The user may then continue playing the game on another device that operates on a different (but supported) platform. As part of the move to the new platform, the example procedure of FIG. 6 can be used to facilitate the move so that digital content items purchased by the user are seamlessly transferred to the new platform.

As above, the illustrated interactions are shown by way of example only, as any one or more of the interactions may be omitted in certain embodiments, performed in a different sequence, performed concurrently, or replaced by some other actions. Also, additional interactions may also be included that are not illustrated here.

At 611, the main application signs the user into a service 634 that provides player tracking services (e.g., across multiple platforms). For example, the player tracking services 634 can be a centralized service (e.g., XBOX Live) that maintains on-line user records, including a user's on-line identification, progress, status, and/or application downloads. Once signed-in, this data can be shared with the main application 620.

At 612, the main application checks to see if the user either has existing platform in-app purchases (e.g., old purchases for skin packs, texture packs, or mash-ups within the same platform) or performs a "restore purchases" operation in which one or more receipts from a first platform are converted into one or more receipts that are recognized across multiple platforms. For instance, a digital receipt of digital content (e.g., an entitlement or durable) purchased from one platform can be converted into a digital receipt that enables access to the digital content for a second (or multiple other available platforms). Thus, a player purchasing an instance of digital content from a first device (e.g. operating on a first platform) can use/access the digital content from a second device (e.g., operating on a second platform different from and incompatible with the first platform) since the digital receipt can be validated with the player across a plurality of devices (e.g., across any device).

At 613, the main application transmits the user's identity and receipts (e.g., converted receipts to account for purchases to be applied across multiple platforms) to a wallet and in-app purchases service 636. This enable so-called "buy once play anywhere" ("BOPA") functionality where the purchased digital items (e.g., durables and entitlements) are union from all platforms.

At 614, an acknowledgement, key, and/or other verification of purchased digital content (e.g., entitlements and/or durables) is received from the wallet and in-app purchases service 636. Further, in some implementations, the digital content can be signed by the wallet and entitlement service 636 to ensure its authenticity.

At 615, item details for the digital content verified as having been purchased at 614 are received. In particular embodiments, the main application 620 transmits the identification and other verification credentials to the storefront 630. In turn, the storefront 630 can provide one or more networks addresses (e.g., one or more URLs) for downloading the content from the appropriate content delivery network (CDN) where the content is adapted for use on the current platform. In some cases, the digital content is stored at one or more servers controlled and supported by a single entity or organization (e.g., the entity or organization controlling the main application 620). In other cases, the digital content may be stored at one or more servers operated by different entities or organizations than the entity or organization controlling the main application 620.

At 616, the digital content (e.g., the entitlement and/or durable) is downloaded from the catalog for any items not already on the user's device. Further, the digital content can be specific to the platform on which the main application is currently running.

Figure 7:
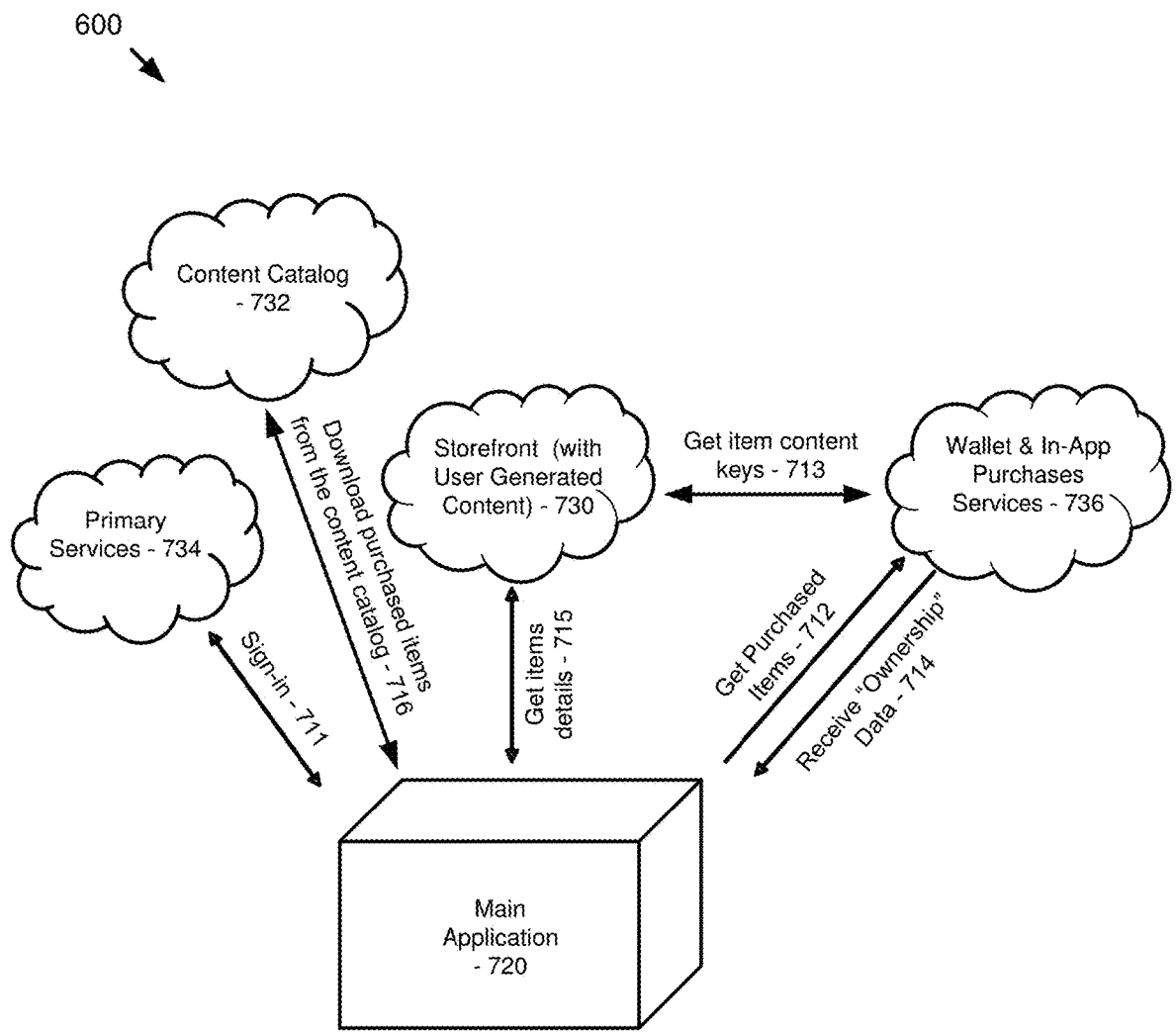

FIG. 7 is a schematic block diagram 700 illustrating another example network configuration and series of communications between network elements. The network configuration includes a main application running on a user's computing device. As noted, the user's computing device can be a wide variety of devices, such as a gaming console, PC, mobile device, or the like. Further, the device may be operating any of a variety of operating system or platforms (e.g., Windows, Unix, IOS, Android, and the like). The main application can be, for example, a game application (e.g., Minecraft or other game application). In the illustrated embodiment, the main application offers a marketplace in which a user may purchase and obtain digital content, including content generated by third-party users (shown as "user generated content"). To facilitate this capability, and in accordance with the illustrated embodiment, one or more additional services/applications can be used. Example services are shown at 730, 732, 734, 736 in FIG. 7 and may be provided by separate servers, which in turn may be operated and controlled by separate entities or organizations as the entity operating and controlling the main application server 720. Alternatively, any one or more of the illustrated services may be combined and operated by a single server and/or entity.

More specifically, FIG. 7 shows an example sequence of interactions that provide content copy protection functionality to ensure that digital content (e.g., durables and/or entitlements, including digital content created by a third party (such as user-generated content)) is appropriately tracked and verified for copy protection purposes.

As above, the illustrated interactions are shown by way of example only, as any one or more of the interactions may be omitted in certain embodiments, performed in a different sequence, performed concurrently, or replaced by some other actions. Also, additional interactions may also be included that are not illustrated here.

At 711, the main application 720 signs the user into a service 734 that provides player tracking services (e.g., across multiple platforms). For example, the player tracking services 734 can be a centralized service (e.g., XBOX Live) that maintains on-line user records, including a user's on-line identification, progress, status, and/or application downloads. Once signed-in, this data can be shared with the main application 720 as needed.

At 712, the main application 720 requests all of the user's purchased items from the wallet and in-app purchases services 736. The request can include data that authenticates the user. For example, the request can include a token that can be validated against an authentication service supported by the wallet and in-app purchases server. In this embodiment, the wallet and in-app purchases services 736 maintains a secure record of the user's purchases from the storefront 730.

At 713, in response to the request at 712, the wallet and in-app purchases services 736 retrieves copy protection keys from the storefront 730 (or, in some embodiments, from the content catalog 732). In particular embodiments, the wallet and in-app purchases services 736 and the storefront 730 communicate via a secure connection. The copy protection keys content keys can be keys (e.g., encrypted keys) according to any suitable copy protection scheme (e.g., any available private/public key-based approach).

At 714, the wallet and in-app purchases services 736 returns the keys (e.g., the encrypted keys) to the main application 720. In some embodiments, the keys can be further obfuscated. For instance, the keys can be included with other content or in a separate payload. As an example, data identifying which entitlements are owned by the user (corresponding to the keys) can also be transmitted to the main application 720.

At 715, and based on the data indicating the user's entitlements, the main application 720 communicates with the storefront 730 (or the content catalog 732) to retrieve details about the purchased items. The details can include, for example, URL addresses (or other identification and/or download information) for downloading the previously purchased items from the content catalog 732.

At 716, the main application 720 requests downloads and downloads the one or more purchased items from the content catalog 732. The requests can include data from the wallet and in-app purchases services 736 that shows ownership of the purchased items. In some embodiments, the retrieved data is encrypted digital content for the purchase items. In such cases, once downloaded, the main application server 720 can decode the content using the keys retrieved from the wallet and in-app purchases services 736.

In some embodiments, once the purchased items have been downloaded, they can persist on the main application, even if the main application is offline.

Figure 8:
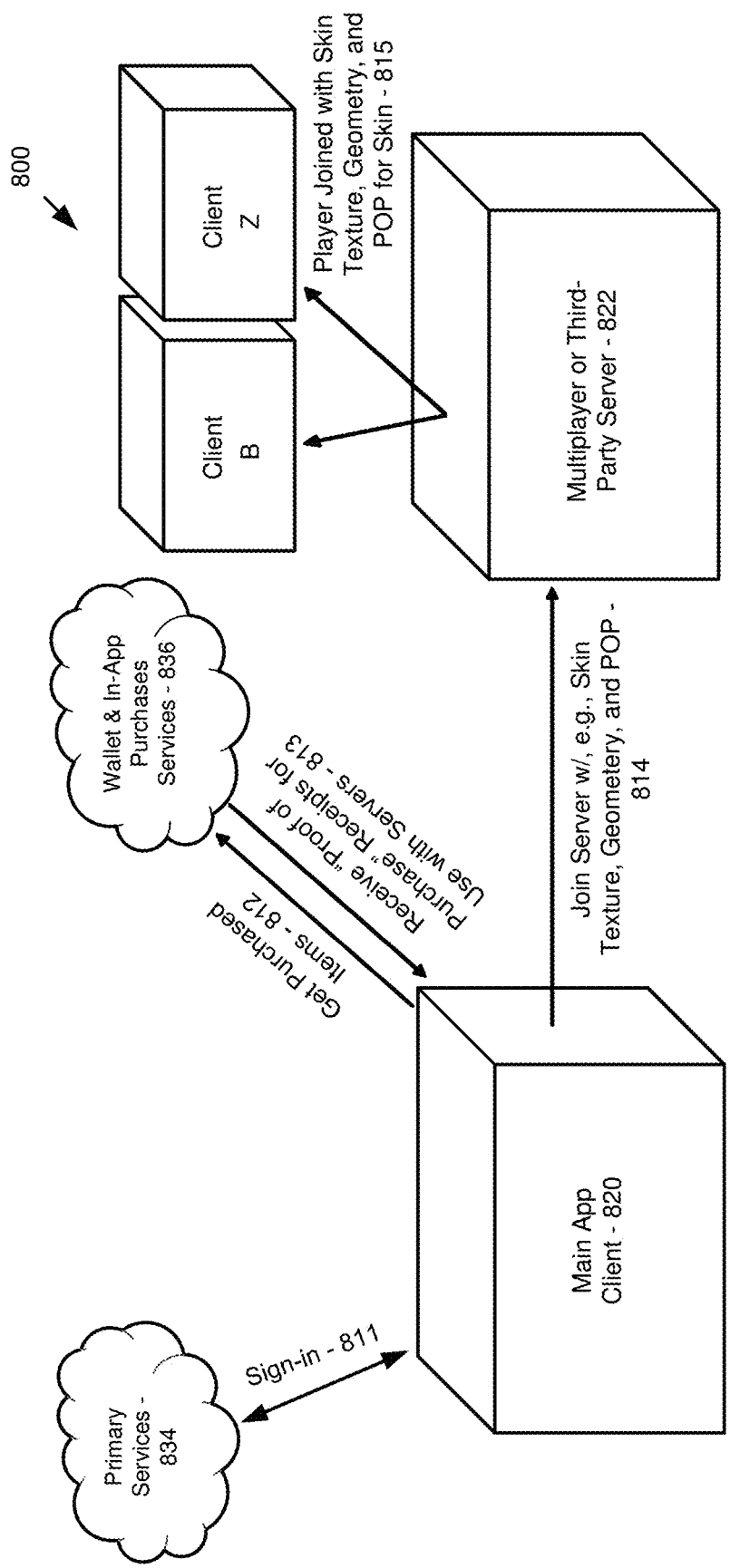

FIG. 8 is a schematic block diagram 800 illustrating another example network configuration and series of communications between network elements. In FIG. 8, a main application client 820 is being run (executed) by a user's computing device. The user's computing device can be a wide variety of devices, such as a gaming console, PC, mobile device, or the like. Further, the device may be operating any of a variety of operating system or platforms (e.g., Windows, Unix, IOS, Android, and the like). The main application client 820 can be, for example, a game application (e.g., Minecraft or other game application). In the illustrated embodiment, the main application is configured to interact with a multiplayer or third-party server 822. The linkage to the multiplayer or third-party server 822 can be over a local-area network or other suitable network (e.g., the internet). In the illustrated embodiment, the third-party server 822 can host a mini-game, game environment, or other digital environment in which the user of the main application can utilize purchased items (e.g., durables and/or entitlements). In particular embodiments, the purchased items are specific to the mini-game, game environment, or other digital environment and can only be used by the user when the user operates within the environment hosted by the third-party server. In such cases, the purchased digital content (e.g., durables and/or entitlements) may nevertheless be managed by a centralized service, such as the wallet and in-app purchases services 836. Other example services can also include primary services 834. The illustrated services may be provided by separate servers, which in turn may be operated and controlled by separate entities or organizations than the entity operating and controlling the main application 820. Alternatively, any one or more of the illustrated services may be combined with one another and provided by a single server and/or entity.

For illustrative purposes, the block diagram of FIG. 8 illustrates a scenario where a copy-protected entitlement (e.g., an avatar skin) is used in a multi-player environment or third-party environment (e.g., a third-party-hosted mini-game or world).

At 811, the main application 820 signs the user into a service 834 that provides primary player tracking services (e.g., across multiple platforms). For example, the primary player tracking services 834 can be a centralized server that provides primary services (e.g., XBOX Live) that maintains on-line user records, including a user's on-line identification, progress, status, and/or application downloads. Once signed-in, this data can be shared with the main application 820 as needed.

At 812, the main application 820 requests one or more proofs of purchase for the user's purchased items from the wallet and in-app purchases services 836. The request can include data that authenticates the user. The request can include, for instance, data that authenticates the user. For example, the request can include a token that can be validated against an authentication service supported by the wallet and in-app purchases server. In this embodiment, the wallet and in-app purchases services 836 maintains a secure record of the user's purchases from the storefront 830 and can generate the requested proof(s) of purchase. In the illustrated scenario, it is assumed that the purchased items have been downloaded by the main application (e.g., according to the procedure illustrated in FIG. 7). In other embodiments, however, the entitlements can be downloaded simultaneously or substantially simultaneously with the request for the proofs of purchase.

At 813, the wallet and in-app purchases services 836 returns "proof of purchase" receipts for the purchased items. The proof of purchase can be, for example, a digital receipt memorializing the purchase with an identification of the item purchased, a record number verifiable with the wallet and in-app purchases server, and/or other such purchase data. In some embodiments, for any purchased item (e.g., entitlement and/or durable) that may be transmitted to a multiplayer or third-party server for the main application (e.g., a skin), the proof of purchase may be for the identity of the skin as well as for the geometry of the skin.

At 814, the main application 820 communicates with a multiplayer or third-party server 822 and transmits a request to log-in (or join) the server 822. The communications can further include data defining an entitlement (e.g., the texture and/or geometry) available for use in a game/world/environment hosted by the server 822 and/or a proof of purchase for the entitlement. For instance, the multiplayer or third-party server 822 may host a game/world/environment created by one or more clients (examples of which are shown as "client B" and "client Z").

At 815, a selection is made to enter a game/world/environment hosted by the server 322 and established by one of the clients of the server 322 (e.g., client B or client Z). In the illustrated embodiment, the server 322 passes the data related to the purchased items owned by the user (e.g., the texture, geometry, and/or proof of purchase) to the game/world/environment of the third-party client hosted by the server 822.

Still further, data for the items (e.g., data for rendering the items) owned by players can be passed through the server 322 to other players (e.g., other clients of the server 322, such as client B or client Z). For instance, in a multi-player environment, data for rendering a particular digital item purchased by a first client (e.g., client A) on the display of other players (e.g., client B, client C, . . . , client Z) can be transmitted to the devices operated by the other players. As one example, if client A purchased a skin (e.g., a skin exclusive to a game/world/environment hosted by the server 322 or durable across games/worlds/environments) and joins the game/world/environment hosted by the third-party server (e.g., server 322), then the skin can be passed to all active clients of the third-party server in the same game/ world/environment so that the skin data is passed to those clients for rendering even though the other clients do not themselves own the skin.

G. Example Methods for Performing Embodiments of the Disclosed Technology

FIGS. 9-12 are flow charts illustrating example methods for implementing embodiments of the disclosed technology. The methods shown in FIGS. 9-12 provide a variety of technical and internet-centric benefits, including one or more of: the ability to share computational resources across multiple distributed computing devices (e.g., remote servers), thereby reducing local computational process load at the computing device executing the main application; the ability to share memory resources across multiple computing devices (e.g., remote servers), thereby reducing local memory resource load at the computing device executing the main application; the ability to facilitate the sale and purchase of third-party developer content through a common in-app marketplace across a spectrum of platforms, thereby reducing the computational, memory, and network resources necessary to support platform-specific marketplaces; the ability to track and manage purchased digital content across a spectrum of platforms that support a user instance of the application, also reducing the computational, memory, and network resources necessary to support platform-specific marketplaces; the ability to provide hosted content for an application (e.g., worlds, mini-games, etc.) through distributed first- or third-party hosts, thereby reducing the computational and memory burden on the local computing device of the user; the ability to host game worlds in a scalable environment (e.g., a cloud-based environment) that uses only a small computational and memory footprint on local devices and instead relies on distributed computing and memory resources to host such worlds (e.g., in many instances, the memory and computational burden for providing the hosted world exceeds the computing and memory resources available on the local computing device, such as a mobile device); and/or the ability to manage digital rights related to the purchased digital content in a digital environment that allows third-party hosts and is available across a spectrum of platforms.

FIG. 9 is a flowchart of an example method 900 for providing an in-application marketplace for digital offerings (e.g., entitlements and/or durables) in accordance with the disclosed technology and as illustrated in FIG. 5. The example method 900 can be performed, for instance, by a server hosting the in-application marketplace accessible by computing devices executing the application across a plurality of platforms. The illustrated embodiment should not be construed as limiting, as the disclosed method acts can be performed alone, in different orders, or at least partially simultaneously with one another. Further, any of the disclosed methods or method acts can be performed with any other methods or method acts disclosed herein.

At 910, a query is received from a remote computing device executing an application. In this example, the query is to provide (return) data identifying one or more digital offerings available for purchase within the application. Further, the application in this embodiment is an application that provides a virtual environment in which an avatar of a user interacts and/or navigates.

At 912, the digital offerings available for purchase within the application are received (e.g., from a separate server or database storing the available digital offerings). In this embodiment, the digital offerings include one or more digital offerings created by third parties that are separate and different from a creator, publisher, and owner of the application.

At 914, the digital offerings available for purchase within the application are transmitted to the remote computing device for inclusion in an in-application marketplace displayed on a display associated with the remote computing device.

In some embodiments, the digital offerings include a durable digital item. For instance, the digital durable item can be an item that the user is granted permanent ownership to and that can be used in both an environment provided by the application as well as an environment created and hosted by a third party other than the creator, publisher, and/or owner of the application. In certain embodiments, the digital offerings include an entitlement that is specific and exclusive to an environment provided by an environment created and hosted by a third party server that is separate from any server hosted by a creator, publisher, or owner of the application. Further, in some embodiments, the digital offerings are purchasable using a virtual currency. As explained above, the virtual currency can be purchasable from a platform-specific app store separate from the in-application marketplace (e.g., an app store offered by an operator of the app store). In some embodiments, a purchase by a user of one of the digital offerings created by a respective third party results in a payment to the respective third party in a real-world currency.

Further, in some cases, the digital offerings available for purchase within the application are filtered to be platform-specific to the remote computing device, thereby eliminating one or more digital offerings available on platforms other than a platform on which the remote computing device operates. In other cases, the digital offerings available for purchase within the application are filtered to be platform-version-specific to the remote computing device, thereby eliminating one or more digital offerings available on platform versions different than the platform and platform version being run on the remote computing device.

Figure 10:
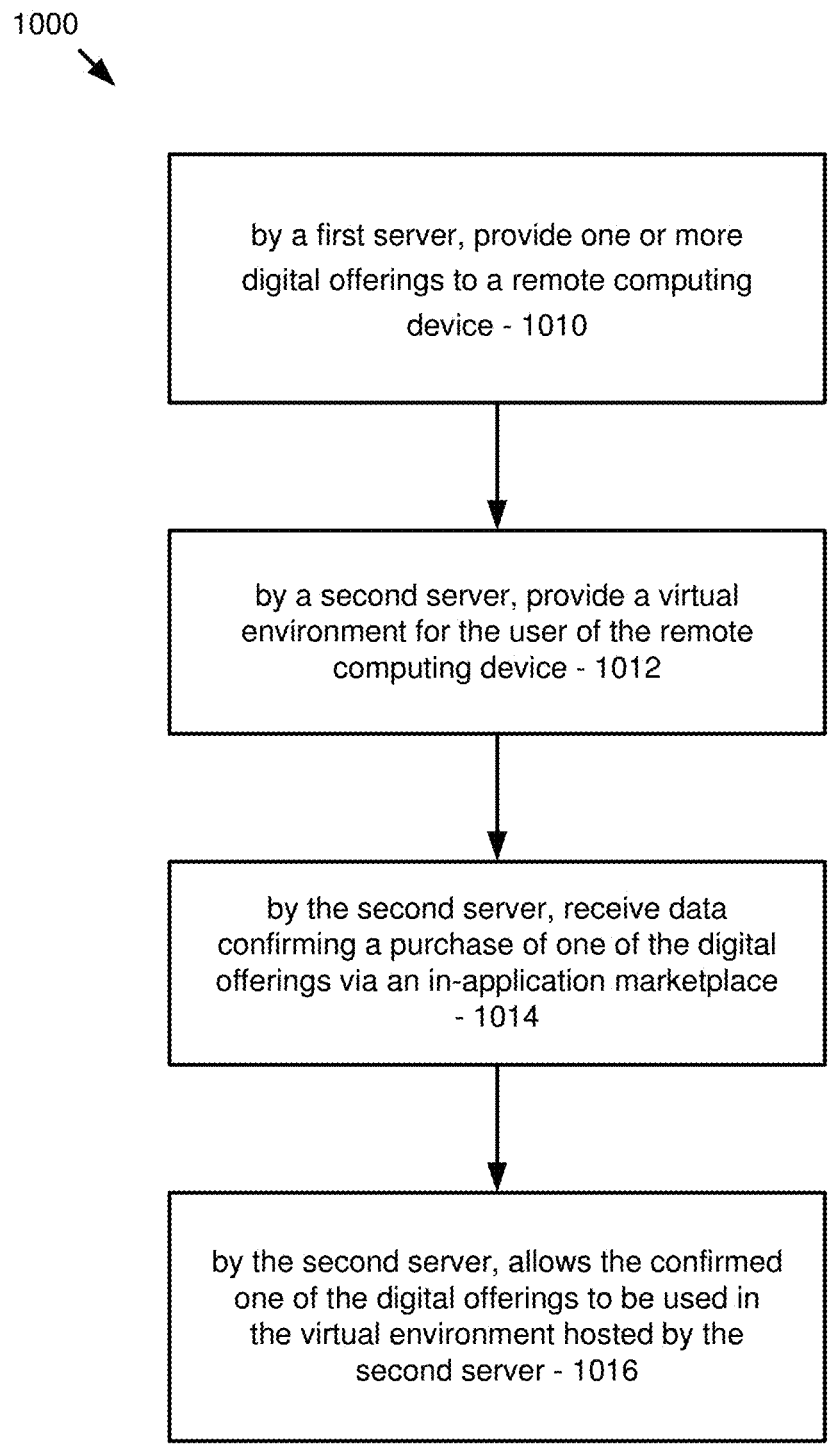
FIG. 10 is a flowchart of another example method for enabling an in-application digital marketplace in accordance with the disclosed technology and as illustrated in FIG. 5.

FIG. 10 is a flowchart of another example method 1000 for enabling an in-application digital marketplace in accordance with the disclosed technology and as illustrated in FIG. 5. The particular embodiment should not be construed as limiting, as the disclosed method acts can be performed alone, in different orders, or at least partially simultaneously with one another. Further, any of the disclosed methods or method acts can be performed with any other methods or method acts disclosed herein.

At 1010, a first server (e.g., a storefront/marketplace server) provides to a remote computing device executing an application one or more digital offerings available for purchase from an in-application marketplace within the application. In the illustrated embodiment, the application is an application providing a virtual environment in which an avatar of the user interacts and/or interacts.

At 1012, a second server (e.g., a third-party server) different and separate from the first server, provides a virtual environment for the user of the remote computing device.

At 1014, the second server receives data confirming a purchase of one of the digital offerings via the in-application marketplace.

At 1016, the second server allows the confirmed one of the digital offerings to be used in the virtual environment hosted by the second server.

In some embodiments, the confirmed one of the digital offerings is created by an entity (e.g., a person or organization that is separate from any of the creator, publisher, or owner of the application) operating the second server. In certain embodiments, the confirmed one of the digital offerings is only authorized for use in the virtual environment hosted by the second server. In further embodiments, the confirmed one of the digital offerings is a durable digital item usable in a virtual environment provided by the application as well as the virtual environment provide by the second server. Further, in such embodiments, the durable digital item can be an item that is also usable in a virtual environment provided by a virtual environment provided by a third server (e.g., another third-party server) different than the second server and different than the environment provided by the application. In some embodiments, the confirmed one of the digital offerings is an entitlement that is specific and exclusive to the environment provided by the second server.

Figure 11:
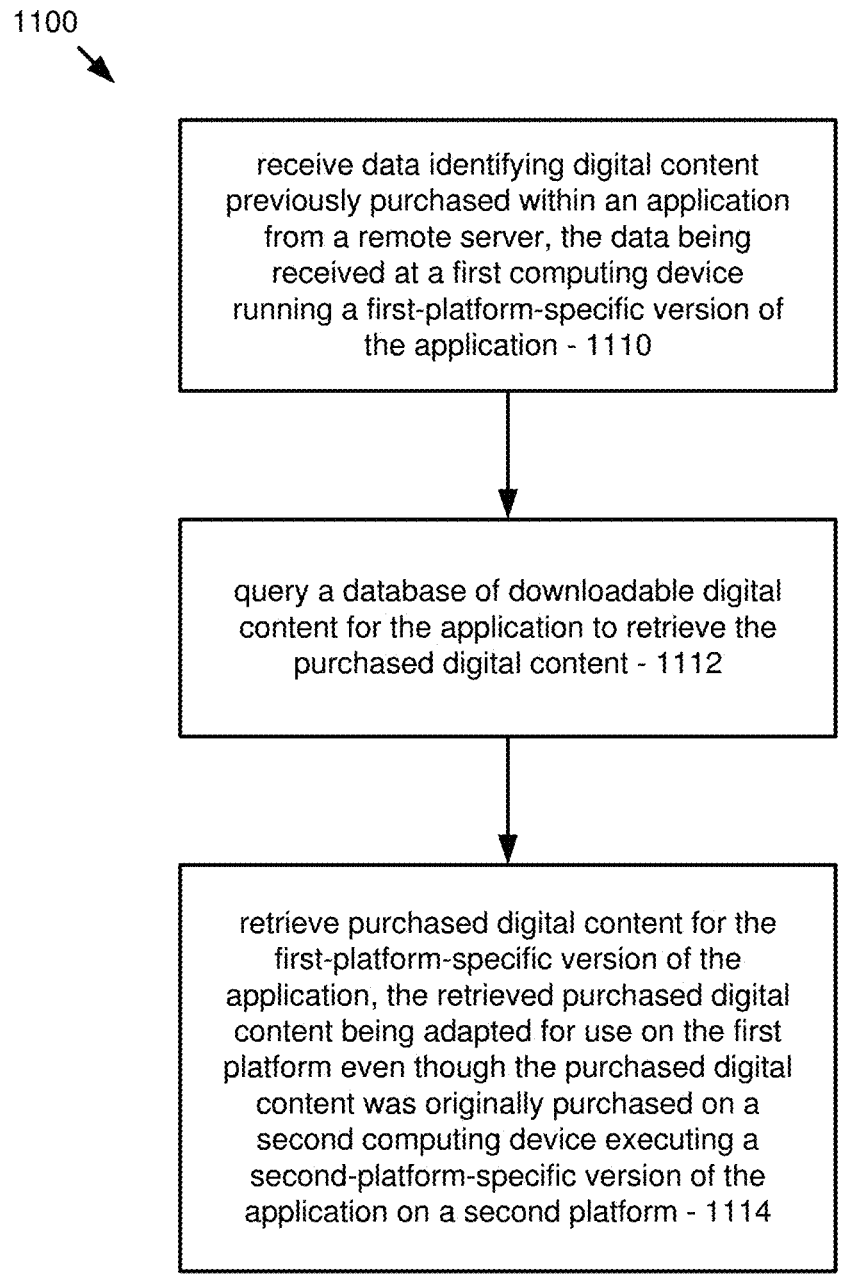
FIG. 11 is a flowchart of an example method for enabling a cross-platform in-application marketplace in accordance with the disclosed technology and as shown in FIG. 6.

FIG. 11 is a flowchart of an example method 1100 for enabling a cross-platform in-application marketplace in accordance with the disclosed technology and as shown in FIG. 6. The example method 1100 can be performed, for instance, by a computing device executing a version of the application adapted for the particular platform running on that computing device (e.g., Windows, Unix, IOS, or Android) and communicating with cross-platform support servers (such as those shown in FIG. 6). The particular embodiment should not be construed as limiting, as the disclosed method acts can be performed alone, in different orders, or at least partially simultaneously with one another. Further, any of the disclosed methods or method acts can be performed with any other methods or method acts disclosed herein.

At 1110, data identifying digital content previously purchased within the application is received from a remote server (e.g., a wallet and in-app purchases server). In this embodiment, the application is an application providing a virtual environment in which an avatar of the user of the first remote computing device interacts and/or navigates.

At 1112, a database of downloadable digital content for the application is queried to retrieve the purchased digital content.

At 1114, purchased digital content for the first-platform-specific version of the application is retrieved. In this embodiment, the retrieved purchased digital content for the first-platform-specific version of the application is adapted for use on the first platform even though the purchased digital content was originally purchased on a second computing device executing a second-platform-specific version of the application on a second platform. Further, in certain embodiments, the second computing device is different and separate from the first computing device.

In some embodiments, the first platform and the second platform have different operating systems from another. Further, in some cases, the originally purchased digital content for the second computing device is incompatible with the first computing device. In particular embodiments, the retrieved purchased digital content was created by a third-party entity other than an entity that is a creator, publisher, or owner of the application but is available at an on-line marketplace provided by the creator, publisher, or owner of the application.

Still further, in some embodiments, the originally purchased digital content of the second computing device is purchased on a personal computer or gaming console, and the first computing device is a mobile smart phone. Alternatively, the originally purchased digital content of the second computing device is purchased on a mobile smart phone, and the first computing device is a personable computer or gaming console.

In some embodiments, the purchased digital content is for an entitlement that is specific and exclusive to an environment provided by a third-party server separate providing an environment separate and different from any environment provided by servers operated or controlled by a creator, publisher, or owner of the application.

Figure 12:
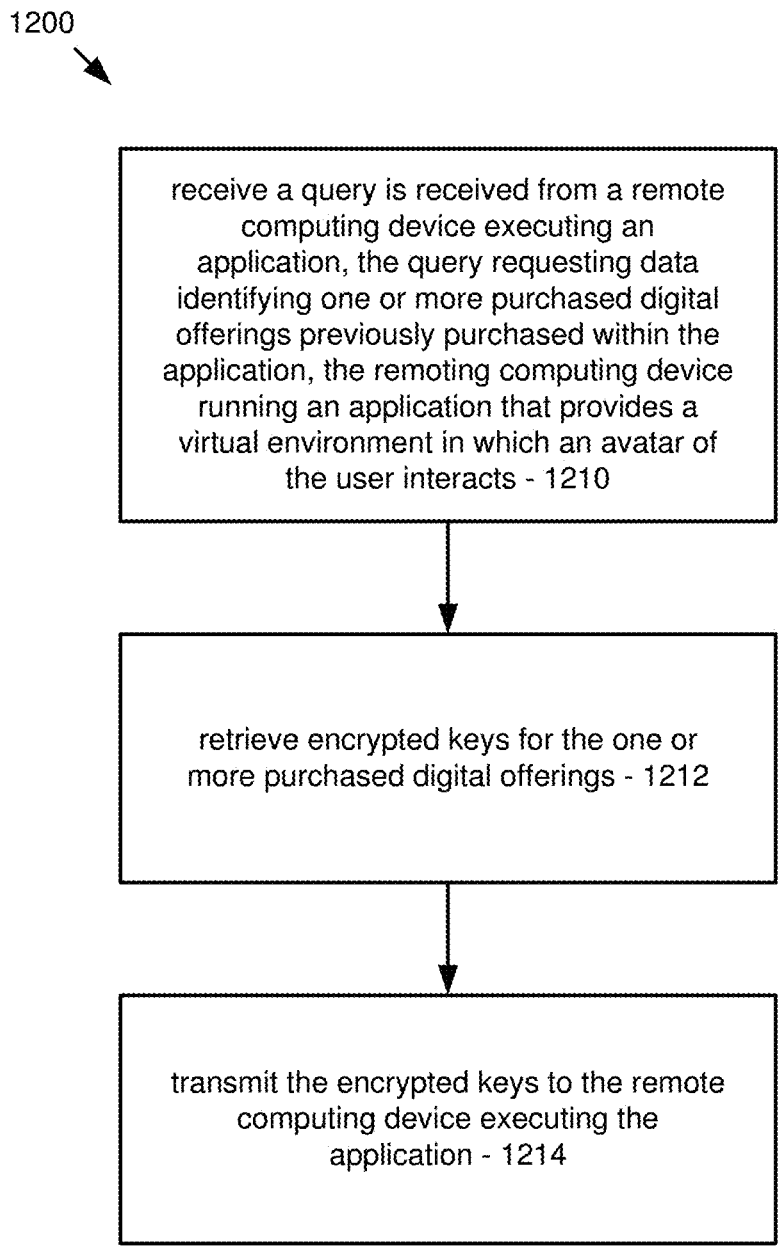
FIG. 12 is a flowchart of an example method for enabling copy-protected use of digital offerings for a cross-platform application in accordance with the disclosed technology and as illustrated in FIG. 7.

FIG. 12 is a flowchart of an example method 1200 for enabling copy-protected use of digital offerings for a cross-platform application in accordance with the disclosed technology and as illustrated in FIG. 7. The method can be performed, for example, by a wallet and in-app purchases server. The particular embodiment should not be construed as limiting, as the disclosed method acts can be performed alone, in different orders, or at least partially simultaneously with one another. Further, any of the disclosed methods or method acts can be performed with any other methods or method acts disclosed herein.

At 1210, a query is received from a remote computing device executing an application. In this embodiment, the query requests data identifying one or more purchased digital offerings previously purchased within the application. Further, in this embodiment, the application is an application providing a virtual environment in which an avatar of a user of the remote computing device interacts and/or navigates.

At 1212, encrypted keys are retrieved for the one or more purchased digital offerings.

At 1214, the encrypted keys to the remote computing device executing the application are transmitted.

In some embodiments, digital proof of ownership data is transmitted to the remote computing device. In certain embodiments, the remote computing device is one of a computing device executing the application or a server hosting an instance of the application. In particular embodiments, the retrieving the encrypted keys comprises requesting the encrypted keys from a separate remote server that hosts a marketplace through which the digital offerings were originally purchased. In some embodiments, the retrieving the encrypted keys comprises requesting the encrypted keys from a separate remote server (e.g., a content catalog server).

Further, in some embodiments, the remote computing device executing the application operates using a first platform; one or more of the purchased digital offerings were purchased by a remote computing device executing an instance of the application operating using a second platform different than the first platform; and the encrypted keys are for versions of the one or more of the purchased digital offerings that are usable in the first platform despite having been purchased by the remote computing device executing the instance of the application operating using the second platform.

Still further, in certain embodiments, the purchased digital content is for an entitlement that is specific and exclusive to an environment provided by a third-party server that is separate and different from any environment provided by servers operated or controlled by a creator, publisher, or owner of the application. In some embodiments, the retrieved purchased digital content was created by a third-party entity other than an entity that is a creator, publisher, or owner of the application but is available at an on-line marketplace provided by the creator, publisher, or owner of the application.

Figure 13:
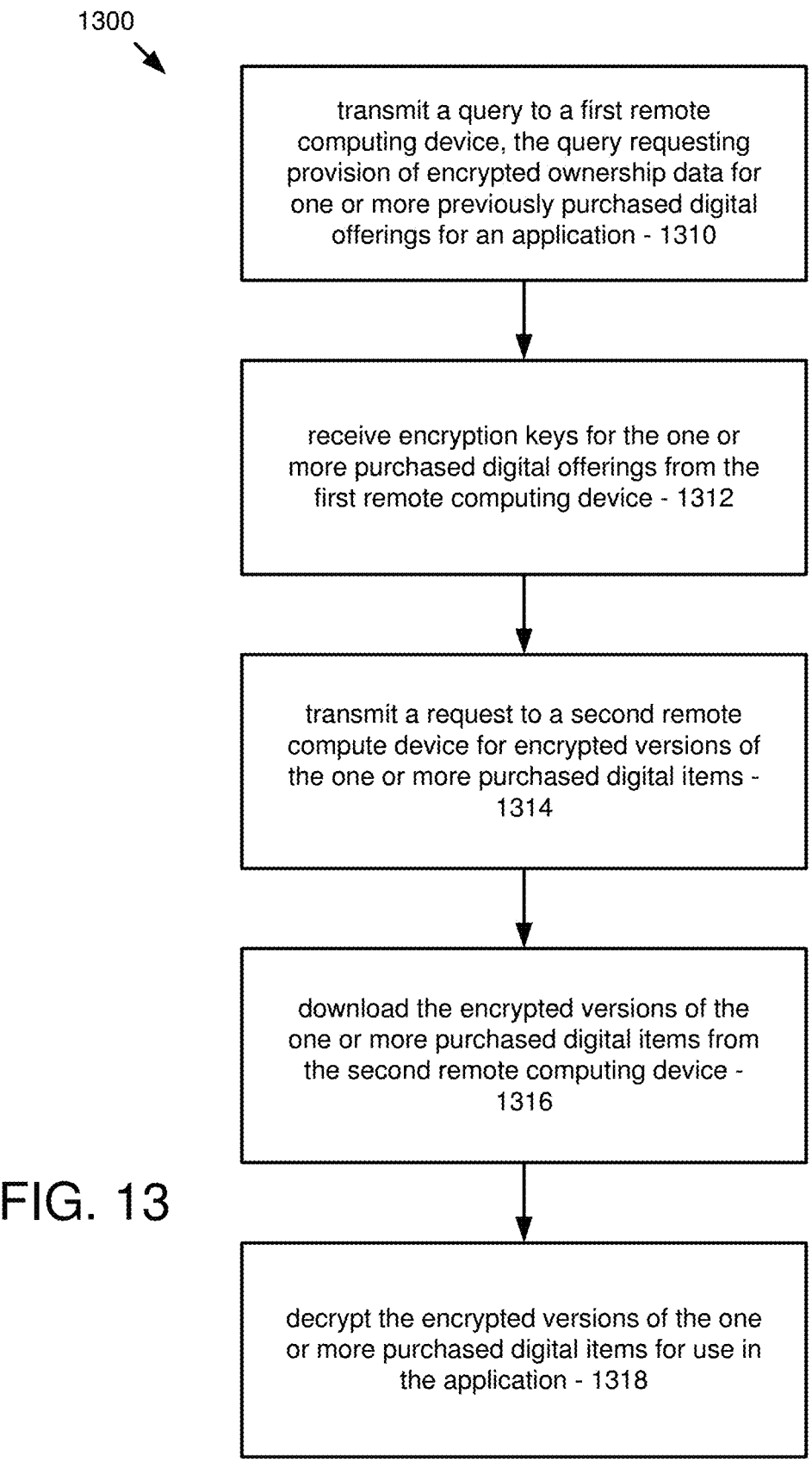
FIG. 13 is a flowchart of an example method for enabling a copy-protected cross-platform in-application digital marketplace in accordance with the disclosed technology as illustrated in FIG. 7.

FIG. 13 is a flowchart of an example method 1300 for enabling a copy-protected cross-platform in-application digital marketplace in accordance with the disclosed technology as illustrated in FIG. 7. The example method 1300 can be performed, for instance, by a computing device executing a version of the application adapted for the particular platform running on that computing device (e.g., Windows, Unix, IOS, or Android) and communicating with cross-platform support servers (such as those shown in FIG. 7). The illustrated embodiment should not be construed as limiting, as the disclosed method acts can be performed alone, in different orders, or at least partially simultaneously with one another. Further, any of the disclosed methods or method acts can be performed with any other methods or method acts disclosed herein.

At 1310, a query is transmitted to a first remote computing device. In the illustrated embodiment, the transmitting is from a first computing device executing an application and the query requests provision of encrypted ownership data for one or more previously purchased digital offerings for the application.

At 1312, encryption keys are received for the one or more purchased digital offerings from the first remote computing device.

At 1314, a request is transmitted to a second remote compute device for encrypted versions of the one or more purchased digital items.

At 1316, the encrypted versions of the one or more purchased digital items are downloaded from the second remote computing device.

At 1318, the encrypted versions of the one or more purchased digital items are decrypted for use in the application.

In certain embodiments, the method is performed by a computing device operating with a first operating system, and one or more of the purchased digital items were purchased by a computing device operating with a second operating system different from the first operating system. In some embodiments, the purchased digital items include an entitlement that is specific and exclusive to an environment provided by a third-party server providing an environment separate and different from any environment provided by servers operated or controlled by a creator, publisher, or owner of the application. In particular embodiments, one or more of the purchased digital items were created by a third-party entity other than an entity that is (any of) a creator, publisher, or owner of the application.

In some embodiments, the method further comprises transmitting a request to sign in to a third remote computing device, the third remote computing device providing player tracking services. In particular embodiments, this signing-in occurs prior to the method acts shown in FIG. 13.

In certain embodiments, one or more of the purchased digital items were purchased via a cross-platform marketplace offered within the application that provides a user access to the one or more purchased digital items on a plurality of computing devices that operate using different and incompatible operating systems.

Figure 14:
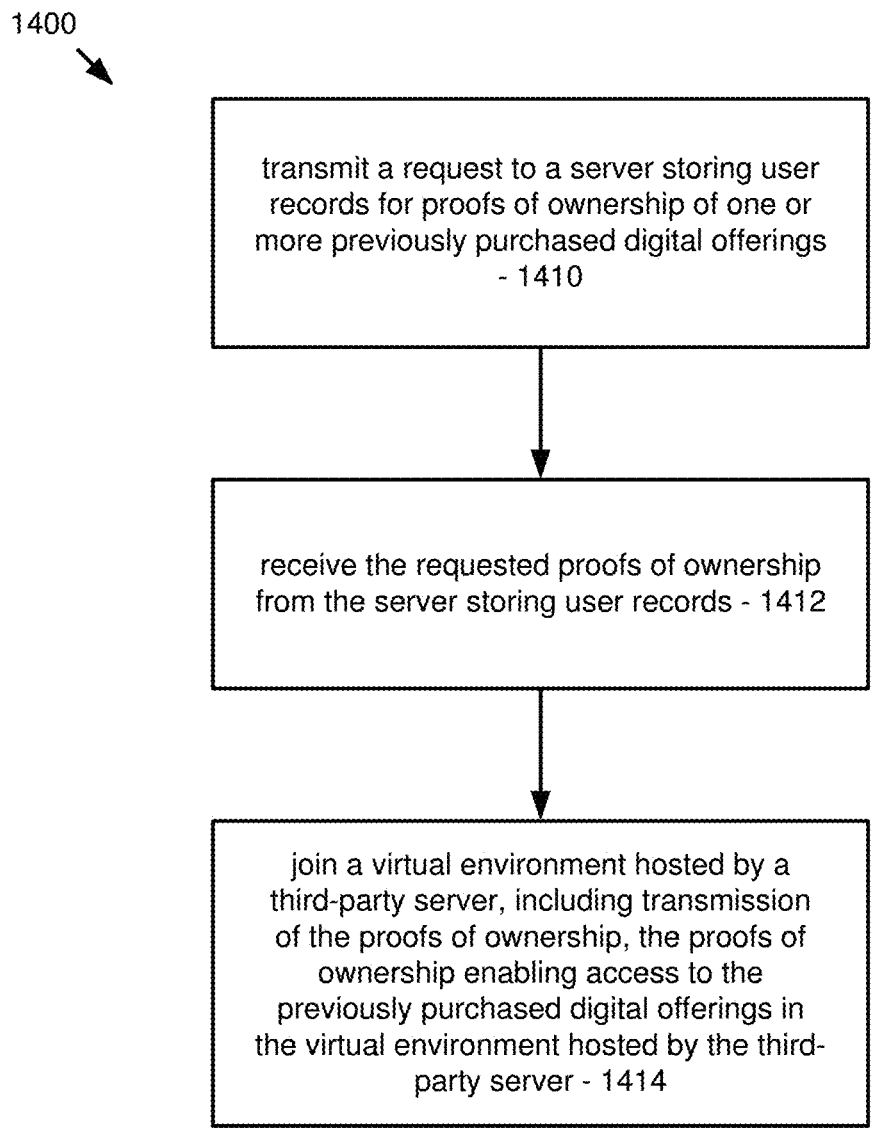
FIG. 14 is a flowchart of an example method for enabling third-party hosts to use copy-protected digital content supported by services separate from the third-party hosts as illustrated in FIG. 8.

FIG. 14 is a flowchart of an example method 1400 for enabling third-party hosts to use copy-protected digital content supported by services separate from the third-party hosts as illustrated in FIG. 8. The example method 1400 can be performed, for instance, by a computing device executing a version of the application adapted for the particular platform running on that computing device (e.g., Windows, Unix, IOS, or Android) and communicating with cross-platform support servers (such as those shown in FIG. 8). The particular embodiment should not be construed as limiting, as the disclosed method acts can be performed alone, in different orders, or at least partially simultaneously with one another. Further, any of the disclosed methods or method acts can be performed with any other methods or method acts disclosed herein.

At 1410, a request is transmitted to a server storing user records (e.g., a wallet and in-app purchases server). In the illustrated embodiment, the request is for proofs of ownership of one or more previously purchased digital offerings.

At 1412, the requested proofs of ownership are received from the server storing user records.

At 1414, a virtual environment is joined. In the illustrated embodiment, the virtual environment is hosted by a third-party server hosting the virtual environment for the application. Further, the third-party server is operated by an entity separate and different than the creator, publisher, and owner of the application. The proofs of ownership are also transmitted to the third-party server, thereby enabling access to the previously purchased digital offerings in the virtual environment hosted by the third-party server.

In some embodiments, one or more of the previously purchased digital offerings are digital offerings that can only be used in the virtual environment hosted by the third-party server. In certain embodiments, the third-party server hosts a multi-player virtual environment or a third-party-exclusive virtual environment. In certain embodiments, the computing device implementing the method operates using a first operating system. In such embodiments, one or more of the previously purchased digital offerings were purchased on a computing device having a processor that operates using a second operating system different than the first operating system. Further, in some embodiments, the purchased digital offerings are downloaded from a server storing the digital offerings, including cross-platform versions of the digital offerings.

IV. Concluding Remarks

In view of the many possible embodiments to which the principles of the disclosed invention may be applied, it should be recognized that the illustrated embodiments are only preferred examples of the invention and should not be taken as limiting the scope of the invention.

What is claimed is:

1. A computer-implemented method, comprising:
receiving a query from a remote computing device executing an application, the query requesting data identifying one or more purchased digital offerings previously purchased within the application, the application providing a first virtual environment in which an avatar of a user of the remote computing device interacts;
retrieving encrypted keys for the one or more purchased digital offerings, the encrypted keys being for versions of the one or more purchased digital offerings that are usable in a third-party virtual environment that is different from the first virtual environment; and
transmitting the encrypted keys to the remote computing device executing the application.

2. The method of claim 1, further comprising transmitting digital proof of ownership data to the remote computing device.

3. The method of claim 1, wherein the remote computing device is one of a computing device executing the application or a server hosting an instance of the application.

4. The method of claim 1, wherein the retrieving the encrypted keys comprises requesting the encrypted keys from a separate remote server that hosts a marketplace through which the digital offerings were originally purchased.

5. The method of claim 1, wherein the retrieving the encrypted keys comprises requesting the encrypted keys from a separate remote server.

6. The method of claim 1, wherein the remote computing device executing the application operates using a first platform, wherein one or more of the purchased digital offerings were purchased by a remote computing device executing an instance of the application operating using a second platform different than the first platform, and wherein the encrypted keys are for versions of the one or more of the purchased digital offerings that are usable in the first platform despite having been purchased by the remote computing device executing the instance of the application operating using the second platform.

7. The method of claim 1, wherein the purchased digital content is for an entitlement that is specific and exclusive to an environment provided by a third-party server providing an environment separate and different from any environment provided by servers operated or controlled by a creator, publisher, or owner of the application.

8. The method of claim 1, wherein the purchased digital content was created by a third-party entity other than an entity that is a creator, publisher, or owner of the application, and wherein the purchased digital content is available at an on-line marketplace provided by the creator, publisher, or owner of the application.

9. A system, comprising:
a processor; and
a memory or storage device storing computer-executable instructions which when executed by the processor cause the processor to:
receive a query from a remote computing device executing an application, the query requesting data identifying one or more purchased digital offerings previously purchased within the application, the application providing a first virtual environment in which an avatar of a user of the remote computing device interacts;
retrieve encrypted keys for the one or more purchased digital offerings, the encrypted keys being for versions of the one or more purchased digital offerings that are usable in a third-party virtual environment that is different from the first virtual environment; and
transmit the encrypted keys to the remote computing device executing the application.

10. The system of claim 9, wherein the computer-executable instructions which when executed by the processor further cause the processor to transmit digital proof of ownership data to the remote computing device.

11. The system of claim 9, wherein the remote computing device is one of a computing device executing the application or a server hosting an instance of the application.

12. The system of claim 9, wherein the computer-executable instructions which when executed by the processor further cause the processor to retrieve the encrypted keys comprises requesting the encrypted keys from a separate remote server that hosts a marketplace through which the digital offerings were originally purchased.

13. The system of claim 9, wherein the computer-executable instructions which when executed by the processor further cause the processor to retrieve the encrypted keys comprises requesting the encrypted keys from a separate remote server.

14. The system of claim 9, wherein the remote computing device executing the application operates using a first platform, wherein one or more of the purchased digital offerings were purchased by a remote computing device executing an instance of the application operating using a second platform different than the first platform, and wherein the encrypted keys are for versions of the one or more of the purchased digital offerings that are usable in the first platform despite having been purchased by the remote computing device executing the instance of the application operating using the second platform.

15. The system of claim 9, wherein the purchased digital content is for an entitlement that is specific and exclusive to an environment provided by a third-party server providing an environment separate and different from any environment provided by servers operated or controlled by a creator, publisher, or owner of the application.

16. The system of claim 9, wherein the purchased digital content was created by a third-party entity other than an entity that is a creator, publisher, or owner of the application, and wherein the purchased digital content is available at an on-line marketplace provided by the creator, publisher, or owner of the application.

17. One or more memory or storage devices storing computer-executable instructions which when executed by a processor cause the processor to perform a method, the method comprising:
receiving a query from a remote computing device executing an application, the query requesting data identifying one or more purchased digital offerings previously purchased within the application, the application providing a first virtual environment in which an avatar of a user of the remote computing device interacts;
retrieving encrypted keys for the one or more purchased digital offerings, the encrypted keys being for versions of the one or more purchased digital offerings that are usable in a third-party virtual environment that is different from the first virtual environment; and
transmitting the encrypted keys to the remote computing device executing the application.

18. The one or more memory or storage devices of claim 17, wherein the method further comprises transmitting digital proof of ownership data to the remote computing device.

19. The one or more memory or storage devices of claim 17, wherein the retrieving the encrypted keys comprises requesting the encrypted keys from a separate remote server that hosts a marketplace through which the digital offerings were originally purchased.

20. The one or more memory or storage devices of claim 17, wherein the retrieving the encrypted keys comprises requesting the encrypted keys from a separate remote server.

* * * * *